US012744692B2

(12) United States Patent
Lee et al.

(10) Patent No.: US 12,744,692 B2
(45) Date of Patent: Sep. 22, 2026

(54) RECEIVER RECEIVING DATA SIGNAL OF MULTI-LEVEL AND ELECTRONIC SYSTEM INCLUDING THE SAME

(71) Applicant: SAMSUNG ELECTRONICS CO., LTD., Suwon-si (KR)

(72) Inventors: Kwangyeon Lee, Suwon-si (KR); Younghwan Chang, Suwon-si (KR); Suhwan Kim, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 17 days.

(21) Appl. No.: 18/942,013

(22) Filed: Nov. 8, 2024

(65) Prior Publication Data

US 2025/0350506 A1 Nov. 13, 2025

(30) Foreign Application Priority Data

May 8, 2024 (KR) ........................ 10-2024-0060675

(51) Int. Cl.
*H04L 25/03* (2006.01)
*H04L 25/49* (2006.01)

(52) U.S. Cl.
CPC .... *H04L 25/03057* (2013.01); *H04L 25/4917* (2013.01); *H04L 2025/03484* (2013.01)

(58) Field of Classification Search
CPC ........... H04L 25/03057; H04L 25/4917; H04L 2025/03484; H04L 25/03063; H04L 25/063; H04L 25/49
See application file for complete search history.

(56) References Cited

U.S. PATENT DOCUMENTS 9,571,115 B1 2/2017 Beukema et al.
9,847,839 B2 12/2017 Gopalakrishnan et al.
10,103,743 B1 * 10/2018 Wang .................... H03M 1/007
10,425,257 B1 * 9/2019 Shakiba ............ H04L 25/03267
10,728,058 B2 7/2020 Sakai
2008/0187036 A1 * 8/2008 Park .................. H04L 25/03146 375/233
2017/0257168 A1 9/2017 Gopalakrishnan et al.
2019/0312757 A1 10/2019 Sakai
2021/0006439 A1 1/2021 Li et al.
2023/0164009 A1 5/2023 Kim et al.
2023/0353177 A1 11/2023 Hossain et al.
2025/0310157 A1 * 10/2025 Lee ..................... H04L 25/4917

FOREIGN PATENT DOCUMENTS

KR 10-2608463 B1 11/2023

* cited by examiner

*Primary Examiner* — David S Huang
(74) *Attorney, Agent, or Firm* — Sughrue Mion, PLLC

(57) ABSTRACT

A receiver includes a first decision feedback equalization (DFE) circuit configured to receive a first multi-level data signal, and output a first bit correction signal correcting a level of the first multi-level data signal based on first bit data of a second multi-level data signal received before the first multi-level data signal, a second DFE circuit configured to output a DFE signal based on second bit data of the second multi-level data signal and levels of data signals received before the second multi-level data signal, and a slicer configured to determine first bit data of the first multi-level data signal based on a level of the first bit correction signal, and correct the level of the first bit correction signal with a second bit correction signal based on the DFE signal.

20 Claims, 18 Drawing Sheets

DATA_SIG1
DATA_SIG2

Figure 6:
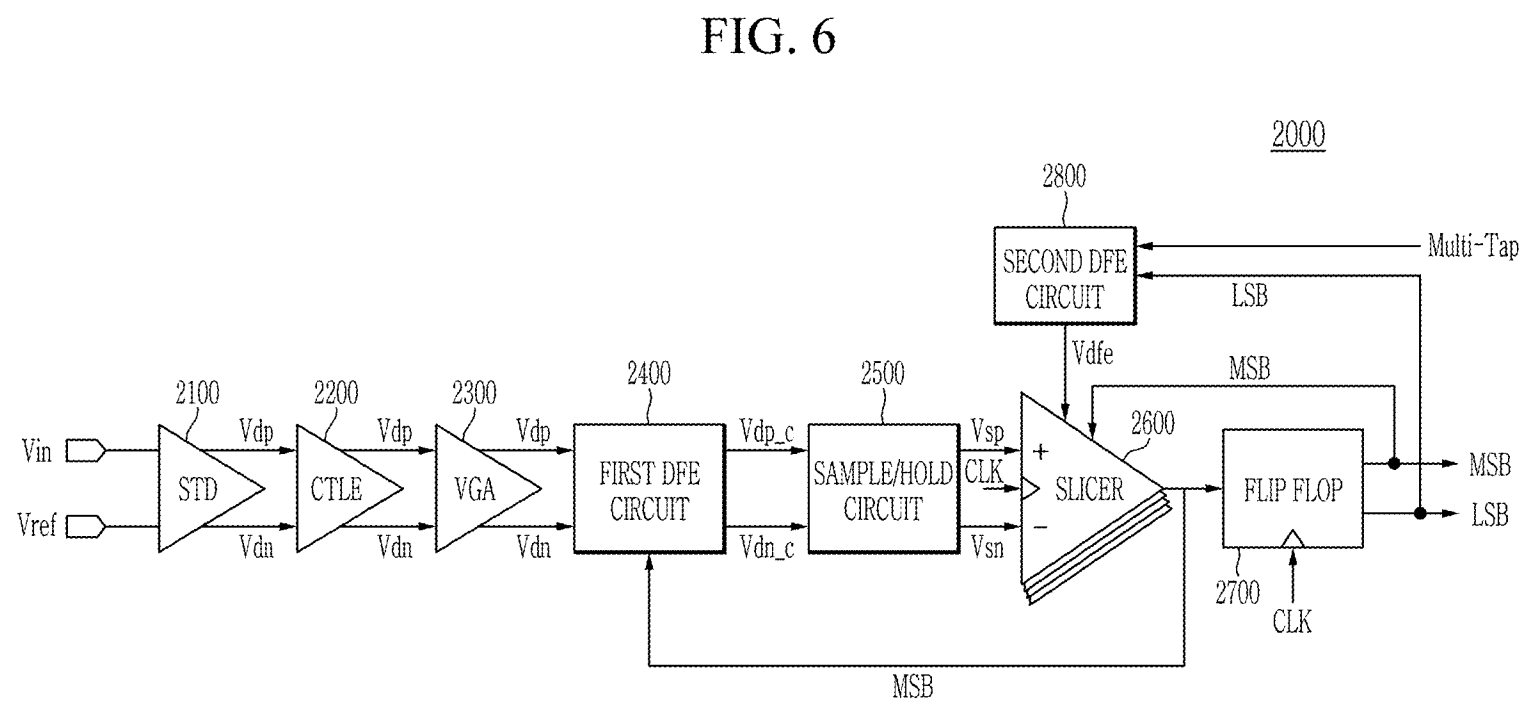

Vin
Vref
2100
STD
Vdp
Vdn
2200
CTLE
Vdp
Vdn
2300
VGA
Vdp
Vdn
2400
FIRST DFE CIRCUIT
Vdp_c
Vdn_c
2500
SAMPLE/HOLD CIRCUIT
Vsp
CLK
Vsn
2600
SLICER
+
−
2700
FLIP FLOP
CLK
MSB
LSB
2800
SECOND DFE CIRCUIT
Vdfe
Multi-Tap
LSB
MSB
MSB

FIG. 7

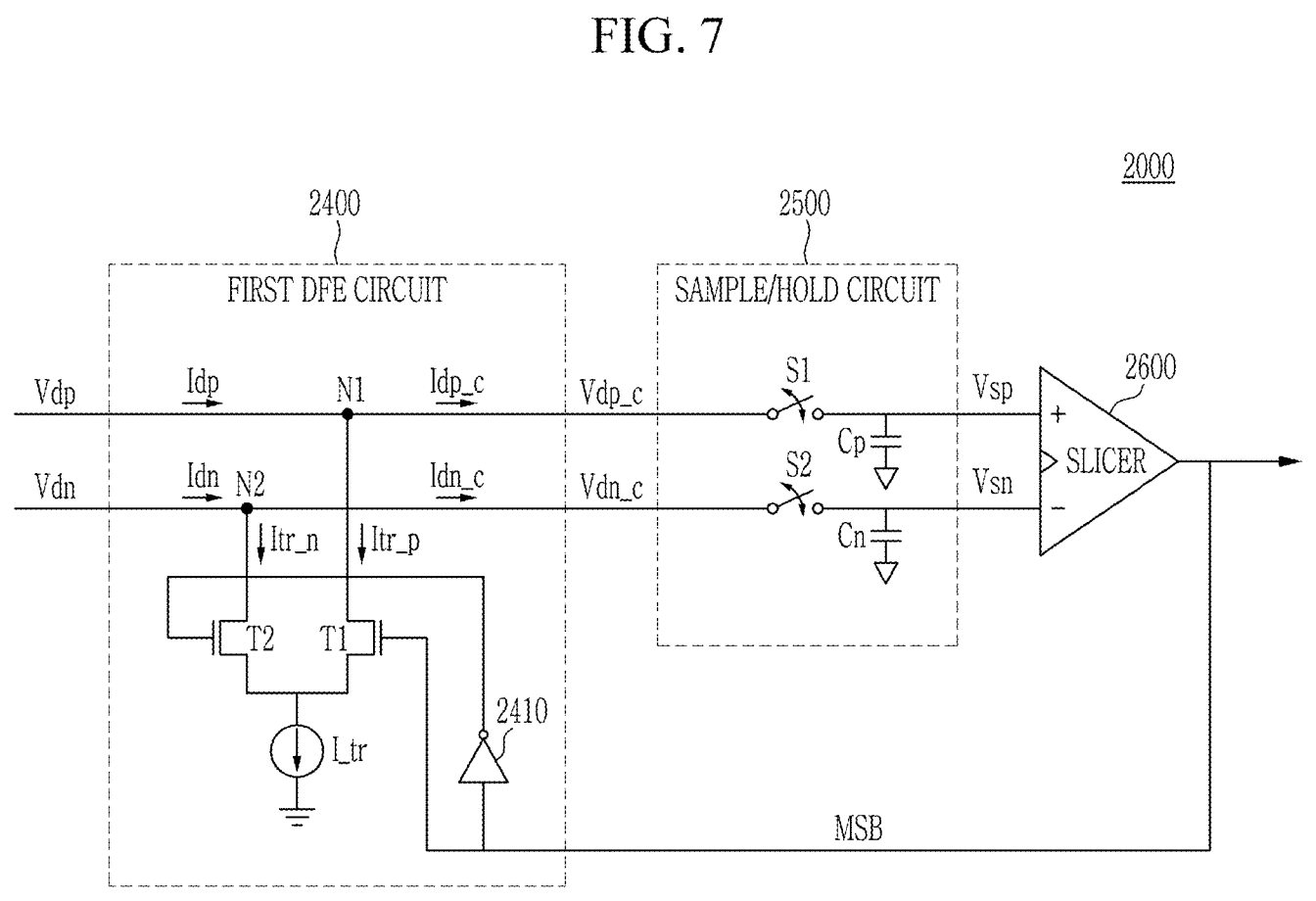

2000
2600
SLICER
+
−
Vsp
Vsn
2500
SAMPLE/HOLD CIRCUIT
S1
S2
Cp
Cn
MSB
Vdp_c
Vdn_c
2400
FIRST DFE CIRCUIT
2410
Idp_c
Idn_c
Itr_p
Itr_n
N1
N2
T1
T2
I_tr
Idp
Idn
Vdp
Vdn

Vdd

T28 T29 T30 T31

3-TAP(MSB) 3-TAP(LSB)

2840 2841 2842 2850 2851 2852

I_3tap (LSB)

I_3tap (MSB)

ⓐ ⓑ ⓒ

EXAMPLE OF 2nd TAP DFE

①: APPLY 1-TAP FOR MSB
②: SAMPLE DATA & DETECT MSB
③: CHANGE REFERENCE VOLTAGE & APPLY MULTI-TAP
④: DETECT LSB 1600
1630
1633
MEMORY
1632
CONTROLLER/
PROCESSOR
1631
MODEM
PROCESSOR
1636
PLL
1635
I/O
CIRCUIT
RISC/DSP
1634
1650
REFERENCE
OSCILLATOR
I/O
DEVICE
1640
1610
RECEIVER
1620
TRANSMITTER
1602

RECEIVER RECEIVING DATA SIGNAL OF MULTI-LEVEL AND ELECTRONIC SYSTEM INCLUDING THE SAME

CROSS-REFERENCE TO RELATED APPLICATION

This application is based on and claims priority to Korean Patent Application No. 10-2024-0060675 filed on May 8, 2024, in the Korean Intellectual Property Office, the disclosure of which is incorporated herein by reference in its entirety.

BACKGROUND

Example embodiments of the disclosure relate to a receiver for receiving a multi-level data signal and an electronic system including the same.

As an amount of data exchanged between electronic devices increases, a communication device that may transmit and receive signals at high speeds is being used. The electronic devices may be connected through a channel, and the channel may transfer the signals transmitted and received between the electronic devices. A pulse amplitude modulation (PAM) method capable of transmitting a plurality of bits through one signal is used as a method for transmitting and receiving the signals at a high speed.

However, if the signals are transmitted and received at a high speed, interference between the signals may occur so that the signals are distorted and a quality of the signals transferred at a high speed is deteriorated.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a receiver capable of removing interference between multi-level data signals and an electronic system including the same.

Additional aspects will be set forth in part in the description which follows and, in part, will be apparent from the description, or may be learned by practice of the presented embodiments.

According to an aspect of an example embodiment, a receiver may include a first decision feedback equalization (DFE) circuit configured to receive a first multi-level data signal, and output a first bit correction signal correcting a level of the first multi-level data signal based on first bit data of a second multi-level data signal received before the first multi-level data signal, a second DFE circuit configured to output a DFE signal based on second bit data of the second multi-level data signal and levels of data signals received before the second multi-level data signal, and a slicer configured to determine first bit data of the first multi-level data signal based on a level of the first bit correction signal, correct the level of the first bit correction signal with a second bit correction signal based on the DFE signal, and determine second bit data of the first multi-level data signal based on a level of the second bit correction signal.

According to an aspect of an example embodiment, a receiver may include a slicer configured to receive a first multi-level data signal, and determine first bit data and second bit data of the first multi-level data signal based on a level of the first multi-level data signal, and a first DFE circuit configured to receive a second multi-level data signal following the first multi-level data signal, and correct a level of the second multi-level data signal based on the first bit data of the first multi-level data signal, where the slicer is further configured to determine first bit data of the second multi-level data signal based on the level of the second multi-level data signal, correct the level of the second multi-level data signal based on the second bit data of the first multi-level data signal, and determine second bit data of the second multi-level data signal based on the level of the second multi-level data signal.

According to an aspect of an example embodiment, an electronic system may include a transmitter configured to sequentially transmit a first multi-level data signal and a second multi-level data signal, and a receiver configured to receive the first multi-level data signal, determine first bit data and second bit data of the first multi-level data signal based on a level of the first multi-level data signal, receive the second multi-level data signal, correct a level of the second multi-level data signal based on the first bit data of the first multi-level data signal, determine first bit data of the second multi-level data signal based on the level of the second multi-level data signal, correct the level of the second multi-level data signal based on the second bit data of the first multi-level data signal, and determine second bit data of the second multi-level data signal based on the level of the second multi-level data signal.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 5 is a diagram illustrating a first tap post cursor according to one or more embodiments;

FIG. 6 is a diagram illustrating an operation of the receiver according to one or more embodiments;

FIG. 7 is a diagram illustrating a first decision feedback equalization (DFE) circuit and a sample/hold circuit according to one or more embodiments;

FIG. 11 and FIG. 12 are diagrams illustrating a second DFE circuit according to one or more embodiments;

DETAILED DESCRIPTION

Figure 1:
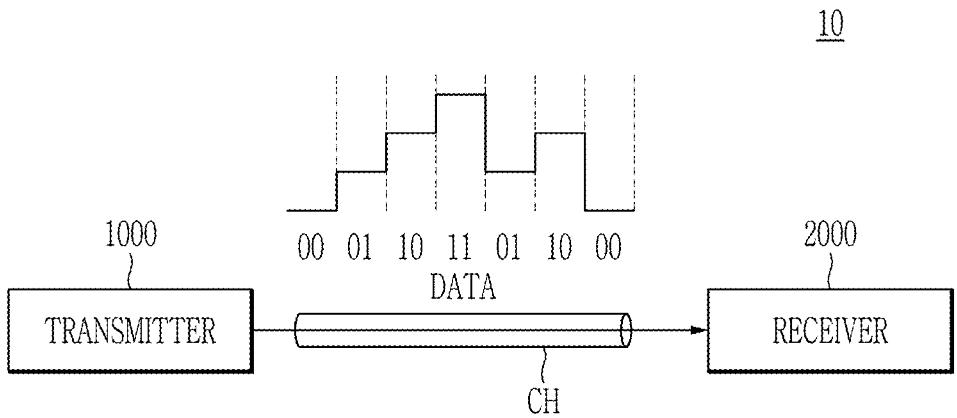
FIG. 1 is a diagram illustrating an electronic system including a transmitter and a receiver according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

FIG. 1 is a diagram illustrating an electronic system including a transmitter and a receiver according to one or more embodiments.

Referring to FIG. 1, the electronic system 10 may include a transmitter 1000 and a receiver 2000.

The transmitter 1000 and the receiver 2000 may be connected through a channel CH. The transmitter 1000 may transmit a data signal DATA to the receiver 2000 through the channel CH. The data signal DATA transmitted by the transmitter 1000 to the receiver 2000 may be an analog signal. The receiver 2000 may convert the analog signal received from the transmitter 1000 into a digital signal.

In one or more embodiments, the data signal DATA transmitted by the transmitter 1000 may be a multi-level pulse amplitude modulation (PAM) signal. In one or more embodiments, the PAM signal may be a signal identified as different symbols depending on a level of the PAM signal. One symbol may include a plurality of bits. In one or more embodiments, the one symbol may include most significant bit (MSB) data and least significant bit (LSB) data.

In one or more embodiments, the multi-level data signal may be a PAM-4 signal with four levels. In one or more embodiments, the PAM-4 signal may be a signal in which the four signal levels are identified as four symbols. In one or more embodiments, the four symbols may be expressed as "00", "01", "10", and "11" with 2-bit numbers. In one or more embodiments, the receiver 2000 may identify a symbol corresponding to the data signal based on a level of the data signal received from the transmitter 1000. The receiver 2000 may identify the data signal as one of "00", "01", "10", and "11" based on the level of the data signal.

In one or more embodiments, the transmitter 1000 and the receiver 2000 may be included in different electronic devices, or may be included in one electronic device.

In one or more embodiments, the transmitter 1000 may be included in a host, and the receiver 200 may be included in a memory device. The host may include a central processing unit (CPU), a graphics processing unit (GPU), an application processor (AP), or the like. The memory device may include a volatile memory device, a non-volatile memory device, or the like.

In one or more embodiments, the transmitter 1000 may be included in a host, and the receiver 2000 may be included in a peripheral device. The peripheral device may include a display device, a communication device, a storage device, or the like.

Figure 2:
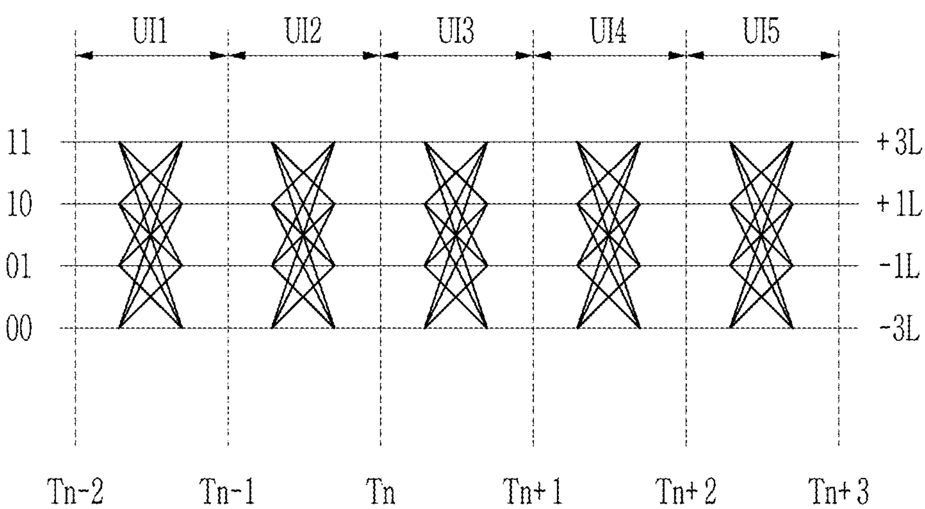
FIG. 2 is a diagram illustrating multi-level data signals according to one or more embodiments.

FIG. 2 is a diagram illustrating multi-level data signals according to one or more embodiments.

Referring to FIG. 2, the receiver 2000 may receive the multi-level data signals. In one or more embodiments, the multi-level data signal may be a PAM-4 signal with four levels. The four levels may correspond to −3 level (−3L), −1 level (−1L), +1 level (+1L), and +3 level (+3L). In one or more embodiments, the level of the data signal may indicate a level of a voltage.

In one or more embodiments, each of the four levels may be mapped to each of the four symbols having 2-bit numbers. In one or more embodiments, the lowest level of the data signal may be −3 level (−3L). −3 level (−3L) may be mapped to the symbol corresponding to "00". In one or more embodiments, if the data signal with −3 level (−3L) is received, the receiver 2000 may identify that it receives data of "00" that is the symbol corresponding to −3 level (−3L).

In one or more embodiments, −1 level (−1L) higher than −3 level (−3L) of the data signal may be mapped to the symbol corresponding to "01". In one or more embodiments, if the data signal with −1 level (−1L) is received, the receiver 2000 may identify that it receives data of "01" that is the symbol corresponding to −1 level (−1L).

In one or more embodiments, +1 level (+1L) higher than −1 level (−1L) of the data signal may be mapped to the symbol corresponding to "10". In one or more embodiments, if the data signal with +1 level (+1L) is received, the receiver 2000 may identify that it receives data of "10" that is the symbol corresponding to +1 level (+1L).

In one or more embodiments, the highest level of the data signal may be +3 level (+3L). +3 level (+3L) may be mapped to the symbol corresponding to "11". In one or more embodiments, if the data signal with +3 level (+3L) is received, the receiver 2000 may identify that it receives data of "11" that is the symbol corresponding to +3 level (+3L).

In one or more embodiments, a mapping relationship between the levels of the data signal and the symbols may vary depending on a code method.

In one or more embodiments, the receiver 2000 may receive the data signal at each unit interval UI, and may convert the data signal into the symbol corresponding to the level. In one or more embodiments, the receiver 2000 may receive a first data signal at a first unit interval UI1, and may convert a symbol corresponding to the first data signal based on a level of the first data signal at a time point Tn−1. In one or more embodiments, the receiver 2000 may receive a second data signal following the first data signal at a second unit interval UI2, and may convert a symbol corresponding to the second data signal based on a level of the second data signal at a time point Tn. Likewise, the receiver 2000 may convert symbols respectively corresponding to a third data signal, a fourth data signal, and a fifth data signal following the second data signal at time points Tn+1, Tn+2, and Tn+3.

Figure 3:
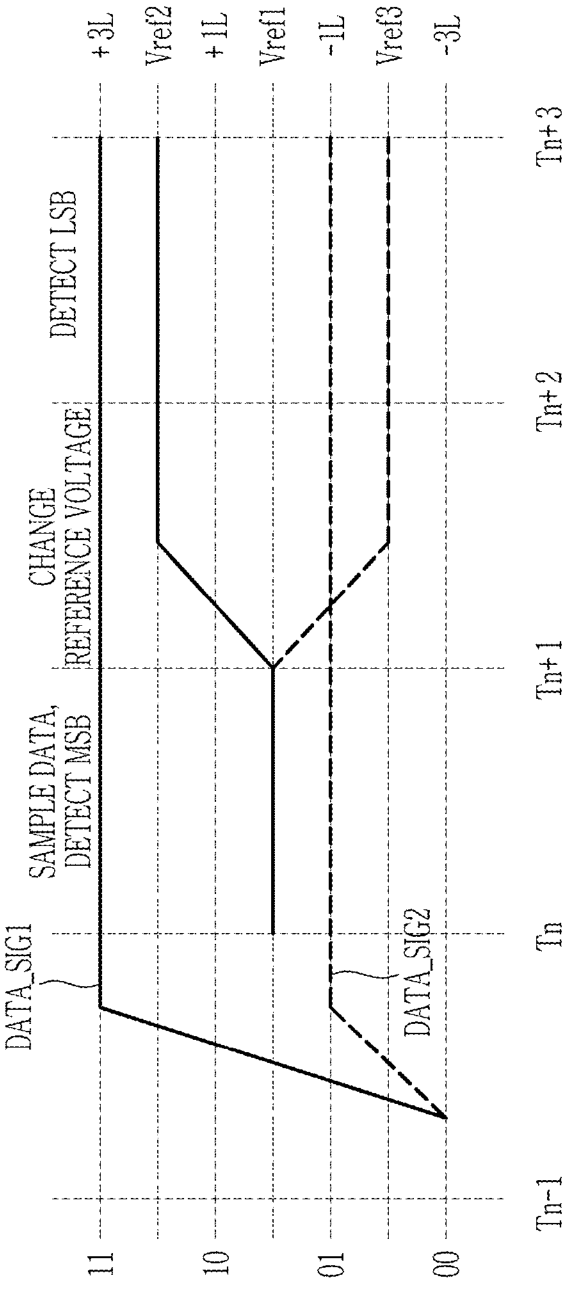
FIG. 3 is a diagram illustrating a receiver that detects first bit data and second bit data of the data signal based on a level of the data signal according to one or more embodiments.

FIG. 3 is a diagram illustrating a receiver that detects first bit data and second bit data of the data signal based on a level of the data signal according to one or more embodiments.

In FIG. 3, a case where the receiver 2000 receives the first data signal DATA_SIG1 or the second data signal DATA_SIG2 will be described as an example. Referring to FIG. 3, the receiver 2000 may receive the first data signal DATA_SIG1 in a section from Tn−1 to Tn. In the section from Tn−1 to Tn, a level of the first data signal DATA_SIG1 may increase from −3 level (−3L) to +3 level (+3L).

In a section from Tn to Tn+1, the receiver 2000 may sample the first data signal DATA_SIG1, and may determine MSB data of the first data signal DATA_SIG1 based on a result of comparing the level of the first data signal DATA_SIG1 with a first reference voltage Vref1. In one or more embodiments, a level of the first reference voltage may correspond to a 0 level. In one or more embodiments, because the level of the first data signal DATA_SIG1 is higher than the first reference voltage Vref1, the receiver 2000 may determine a bit value of the MSB data of the first data signal DATA_SIG1 as "1".

In a section from Tn+1 to Tn+2, the receiver 2000 may change the first reference voltage Vref1 to a second reference voltage Vref2 or a third reference voltage Vref3 based on the MSB data of the first data signal DATA_SIG1. The second reference voltage Vref2 may be higher than the first reference voltage Vref1. The second reference voltage Vref2 may correspond to +2 level. The third reference voltage Vref3 may be lower than the first reference voltage Vref1. The third reference voltage Vref3 may correspond to −2 level. In one or more embodiments, if the bit value of the MSB data of the first data signal DATA_SIG1 is "1", the receiver 2000 may change a reference voltage from the first reference voltage Vref1 to the second reference voltage Vref2, and if the bit value of the MSB data of the first data signal DATA_SIG1 is "0", the receiver 2000 may change the reference voltage from the first reference voltage Vref1 to the third reference voltage Vref3.

In one or more embodiments, because the bit value of the MSB data of the first data signal is "1", the receiver 2000 may change the reference voltage from the first reference voltage Vref1 to the second reference voltage Vref2.

In a section from Tn+2 to Tn+3, the receiver 2000 may determine LSB data of the first data signal DATA_SIG1 based on a result of comparing the level of the first data signal DATA_SIG1 with the second reference voltage Vref2. In one or more embodiments, because the level of the first data signal is higher than the second reference voltage Vref2, the receiver 2000 may determine a bit value of the LSB data of the first data signal DATA_SIG1 to be "1".

In one or more embodiments, the receiver 2000 may receive the first data signal DATA_SIG1 with +3 level, and may convert the first data signal DATA_SIG1 into data of "11" that is the symbol corresponding to +3 level (+3L).

In one or more embodiments, the receiver 2000 may receive the second data signal DATA_SIG2 in the section from Tn−1 to Tn. In the section from Tn−1 to Tn, a level of the second data signal DATA_SIG2 may increase from −3 level (−3L) to −1 level (−1L).

In the section from Tn to Tn+1, the receiver 2000 may sample the second data signal DATA_SIG2, and may sense MSB data of the second data signal DATA_SIG2 based on a result of comparing the level of the second data signal DATA_SIG2 with the first reference voltage Vref1. In one or more embodiments, because the level of the second data signal DATA_SIG2 is lower than the first reference voltage Vref1, the receiver 2000 may determine a bit value of the MSB data of the second data signal DATA_SIG2 to be "0".

In the section from Tn+1 to Tn+2, the receiver 2000 may change the reference voltage from the first reference voltage Vref1 to the third reference voltage Vref3 because the bit value of the MSB data of the second data signal DATA_SIG2 is "0".

In the section from Tn+2 to Tn+3, the receiver 2000 may determine LSB data of the second data signal DATA_SIG2 based on a result of comparing the level of the second data signal DATA_SIG2 with the third reference voltage Vref3. In one or more embodiments, because the level of the second data signal DATA_SIG2 is higher than the third reference voltage Vref3, the receiver 2000 may determine a bit value of the LSB data of the second data signal DATA_SIG2 to be "1".

In one or more embodiments, the receiver 2000 may receive the second data signal DATA_SIG2 with −1 level, and may convert the second data signal DATA_SIG2 into data of "01" that is the symbol corresponding to −1 level (−1L).

Figure 4:
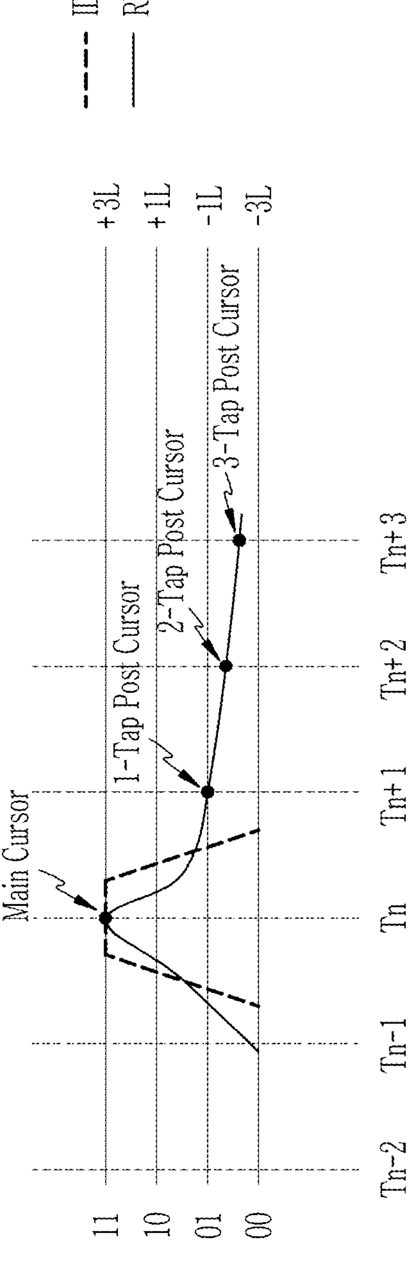
FIG. 4 is a diagram illustrating a multi-tap post cursor due to interference between data signals according to one or more embodiments.

FIG. 4 is a diagram illustrating a multi-tap post cursor due to interference between data signals according to one or more embodiments.

Referring to FIG. 4, in the section from Tn−1 to Tn, the receiver 2000 may receive the first data signal, and may sample the first data signal at the time point Tn. In an ideal case (IDEAL), a level of the first data signal may change according to the dotted line in FIG. 4. In the ideal case, the level of the first data signal may increase from −3 level (−3L) to +3 level (+3L) in the section from Tn−1 to Tn, and may decrease from +3 level (+3L) to −3 level (−3L) in the section from Tn to Tn+1. That is, in the ideal case, the level of the first data signal may be lowered to −3 level (−3L) before the time point Tn+1 of sampling the second data signal following the first data signal.

However, in a real case (REAL), the level of the first data signal may change according to the solid line in FIG. 4. In the real case, the level of the first data signal may not be lowered to −3 level (−3L) even after the time points Tn+1, Tn+2, and Tn+3. That is, in the real case, inter-symbol interference (ISI) where the level of the first data signal affects levels of the data signals to be sampled after the time point Tn, may occur. If interference between the symbols occurs, the level of the data signal may be changed, and if the level of the data signal is changed, the symbol corresponding to the level may be changed.

In one or more embodiments, the receiver 2000 may sample the data signals at every time point of Tn, Tn+1, Tn+2, and Tn+3.

In one or more embodiments, an influence of the first data signal sampled at the time point Tn on a level of the second data signal to be sampled at the time point Tn+1 may be referred to as a first tap post cursor (1-Tap Post Cursor). The level of the first data signal at the time point Tn+1 may change the level of the second data signal to be sampled at the time point Tn+1.

An influence of the first data signal sampled at the time point Tn on a level of the third data signal to be sampled at the time point Tn+2 may be referred to as a second tap post cursor (2-Tap Post Cursor). The level of the first data signal at the time point Tn+2 may change the level of the third data signal to be sampled at the time point Tn+2.

An influence of the first data signal sampled at the time point Tn on a level of the fourth data signal to be sampled at the time point Tn+3 may be referred to as a third tap post cursor (3-Tap Post Cursor). The level of the first data signal at the time point Tn+3 may change the level of the fourth data signal to be sampled at the time point Tn+3.

Figure 5:
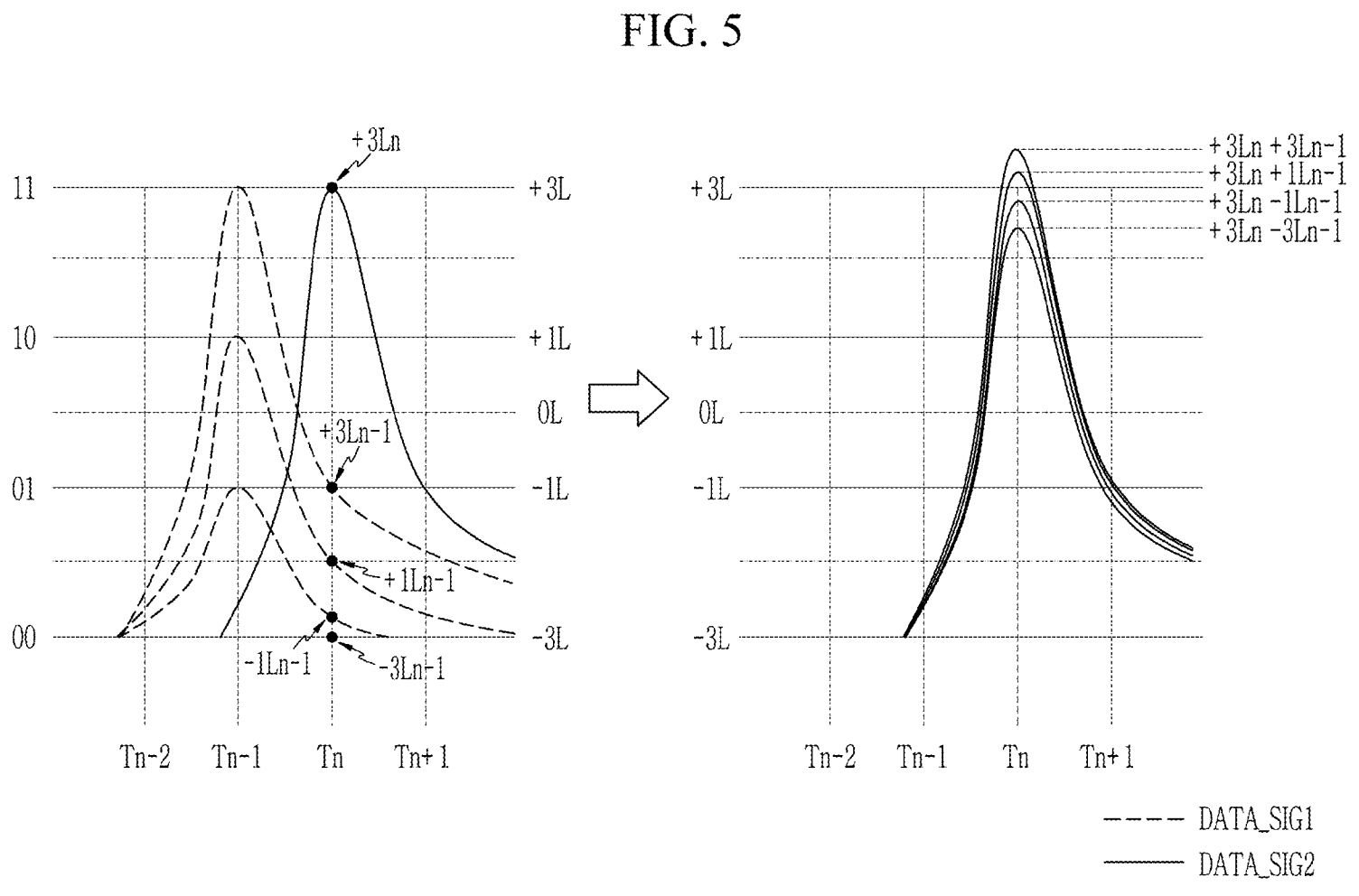

FIG. 5 is a diagram illustrating a first tap post cursor according to one or more embodiments.

Referring to FIG. 5, the receiver 2000 may sample the first data signal DATA_SIG1 indicated as a dotted line at the time point Tn−1, and may sample the second data signal DATA_SIG2 indicated as a solid line at the time point Tn.

A level of the second data signal DATA_SIG2 to be sampled at the time point Tn may be changed under an influence of the first data signal sampled at the time point Tn−1. At the time point Tn, the first tap post cursor where a level of the first data signal DATA_SIG1 affects the level of the second data signal DATA_SIG2 may occur.

At the time point Tn, a degree to which the level of the second data signal DATA_SIG2 is changed may vary depending on the level of the first data signal DATA_SIG1. In one or more embodiments, if the level of the first data signal DATA_SIG1 sampled at the time point Tn−1 is +3 level (+3L), the +3n level (+3Ln) that is the level of the second data signal DATA_SIG2 at the time point Tn may be changed to +3n+3n−1 level (+3Ln+3Ln−1) under an influence of +3n−1 level (+3Ln−1) that is the level of the first data signal DATA_SIG1 at the time point Tn. If the level of the first data signal DATA_SIG1 at the time point Tn−1 is +3 level (+3L), the level of the second data signal DATA_SIG2 at the time point Tn may be higher than +3 level (+3L).

In one or more embodiments, if the level of the first data signal DATA_SIG1 sampled at the time point Tn−1 is +1 level (+1L), the +3n level (+3Ln) that is the level of the second data signal DATA_SIG2 at the time point Tn may be changed to +3n+1n−1 level (+3Ln+1Ln−1) under an influence of +1n−1 level (+1Ln−1) that is the level of the first data signal DATA_SIG1 at the time point Tn. If the level of the first data signal DATA_SIG1 at the time point Tn−1 is +1 level (+1L), the level of the second data signal DATA_SIG2 at the time point Tn may be higher than +3 level (+3L).

In one or more embodiments, if the level of the first data signal DATA_SIG1 sampled at the time point Tn−1 is −1 level (−1L), the +3n level (+3Ln) that is the level of the second data signal DATA_SIG2 at the time point Tn may be changed to +3n−1n−1 level (+3Ln−1Ln−1) under an influence of −1n−1 level (−1Ln−1) that is the level of the first data signal DATA_SIG1 at the time point Tn. If the level of the first data signal DATA_SIG1 at the time point Tn−1 is −1 level (−1L), the level of the second data signal DATA_SIG2 at the time point Tn may be lower than +3 level (+3L).

In one or more embodiments, if the level of the first data signal DATA_SIG1 sampled at the time point Tn−1 is −3 level (−3L), the +3n level (+3Ln) that is the level of the second data signal DATA_SIG2 at the time point Tn may be changed to +3n−3n−1 level (+3Ln−3Ln−1) under an influence of −3n−1 level (−3Ln−1) that is the level of the first data signal DATA_SIG1 at the time point Tn. If the level of the first data signal DATA_SIG1 at the time point Tn−1 is −3 level (−3L), the level of the second data signal DATA_SIG2 at the time point Tn may be lower than +3 level (+3L).

FIG. 6 is a diagram illustrating an operation of the receiver according to one or more embodiments.

Referring to FIG. 6, the receiver 2000 may receive the first data signal from the transmitter 1000, and may convert the first data signal into a symbol corresponding to a level of the first data signal. The receiver 2000 may correct the level of the first data signal based on levels of data signals received before the first data signal, and may determine MSB data and LSB data of the first data signal based on a level of the corrected first data signal.

In one or more embodiments, the receiver 2000 may include a differential amplification circuit 2100, a continuous time linear equalizer (CTLE) 2200, a variable gain amplifier (VGA) 2300, a first decision feedback equalization (DFE) circuit 2400, a sample/hold circuit 2500, a slicer 2600, a flip-flop 2700, and a second DFE circuit 2800.

In one or more embodiments, the differential amplification circuit 2100 may be a circuit that converts a single input signal into a differential signal. The differential amplification circuit 2100 may receive the first data signal received from the transmitter 1000 as an input signal Vin. The differential amplification circuit 2100 may receive a reference signal Vref. The differential amplification circuit 2100 may generate a first differential signal Vdp and a second differential signal Vdn based on a result of comparing the input signal Vin with the reference signal Vref. A difference between a level of the first differential signal Vdp and a level of the second differential signal Vdn may correspond to the level of the first data signal received from the transmitter 1000.

In one or more embodiments, the CTLE 2200 may receive the first differential signal Vdp and the second differential signal Vdn, and may amplify high frequency components of the first differential signal Vdp and the second differential signal Vdn.

In one or more embodiments, the VGA 2300 may amplify the first differential signal Vdp and the second differential signal Vdn.

In one or more embodiments, the first DFE circuit 2400 may correct the level of the first data signal received as the input signal Vin. In one or more embodiments, the first DFE circuit 2400 may output a first bit correction signal that corrects the level of the first data signal based on MSB data of the second data signal received before the first data signal. In one or more embodiments, the first DFE circuit 2400 may receive the MSB data of the second data signal received before the first data signal from the slicer 2600. The first bit correction signal may be a signal that is increased or decreased from the level of the first data signal. A level of the first bit correction signal may correspond to a difference between a first differential correction signal Vdp_c and a second differential correction signal Vdn_c output by the first DFE circuit 2400.

Specifically, the first DFE circuit 2400 may receive the first differential signal Vdp and the second differential signal Vdn, and may output the first differential correction signal Vdp_c correcting the level of the first differential signal Vdp and the second differential correction signal Vdn_c correcting the level of the second differential signal Vdn based on the MSB data of the second data signal received before the first data signal to the sample/hold circuit 2500.

In one or more embodiments, if a bit value of the MSB data of the second data signal received before the first data signal is "1" corresponding to a high level, the first DFE circuit 2400 may output the first differential correction signal Vdp_c that reduces the level of the first differential signal. The first DFE circuit 2400 may output the second differential correction signal Vdn_c with the same level as the level of the second differential signal if the bit value of the MSB data of the second data signal corresponds to "1".

If the bit value of the MSB data of the second data signal received before the first data signal corresponds to "1", the level of the first data signal corresponding to a level difference between the first differential signal Vdp and the second differential signal Vdn may be lowered by the first DFE circuit 2400 to the level of the first bit correction signal corresponding to a level difference between the first differential correction signal Vdp_c and the second differential correction signal Vdn_c.

In one or more embodiments, if the bit value of the MSB data of the second data signal received before the first data signal is "0" corresponding to a low level, the first DFE circuit 2400 may output the first differential correction signal Vdp_c with the same level as the level of the first differential signal Vdp. The first DFE circuit 2400 may output the second differential correction signal Vdn_c that reduces the level of the second differential signal if the bit value of the MSB data of the second data signal corresponds to "0".

In one or more embodiments, if the bit value of the MSB data of the second data signal received before the first data signal corresponds to "0", the level of the first data signal corresponding to a level difference between the first differential signal Vdp and the second differential signal Vdn may be increased to the level of the first bit correction signal corresponding to the difference between the first differential correction signal Vdp_c and the second differential correction signal Vdn_c.

In one or more embodiments, the sample/hold circuit 2500 may sample the first differential correction signal Vdp_c and the second differential correction signal Vdn_c. The sample/hold circuit 2500 may hold the first differential correction signal Vdp_c and the second differential correction signal Vdn_c to output a first sample signal Vsp and a second sample signal Vsn to the slicer 2600. In one or more embodiments, a level of the first sample signal Vsp may be the same as a level of the first differential correction signal Vdp_c. A level of the second sample signal Vsn may be the same as a level of the second differential correction signal Vdn_c. In one or more embodiments, a difference between the first sample signal Vsp and the second sample signal Vsn may correspond to the level of the first bit correction signal.

In one or more embodiments, the slicer 2600 may determine MSB data and LSB data corresponding to the level of the first data signal based on the first sample signal Vsp and the second sample signal Vsn. The slicer 2600 may determine the MSB data of the first data signal based on a result of comparing the difference between the first sample signal Vsp and the second sample signal Vsn with the first reference voltage. The slicer 2600 may output the MSB data of the first data signal to the flip-flop 2700. The slicer 2600 may output the MSB data of the first data signal to the first DFE circuit 2400. The MSB data of the first data signal output to the first DFE circuit 2400 may be used to correct the level of the data signal following the first data signal.

The slicer 2600 may determine the MSB data of the first data signal, and may change the first reference voltage to the second reference voltage higher than the first reference voltage or the third reference voltage lower than the first reference voltage based on the MSB data of the first data signal. In one or more embodiments, the slicer 2600 may change the first reference voltage to the second reference voltage if a bit value of the MSB data of the first data signal corresponds to "1". In one or more embodiments, the slicer 2600 may change the first reference voltage to the third reference voltage if the bit value of the MSB data of the first data signal corresponds to "0".

In one or more embodiments, the slicer 2600 may generate a second bit correction signal correcting the level of the first bit correction signal based on LSB data of the second data signal received before the first data signal and levels of data signals received before the second data signal. In one or more embodiments, the second bit correction signal may be a signal that increases or decreases the level of the first bit correction signal. A level of the second bit correction signal may correspond to a level difference between a first output signal and a second output signal generated by the slicer 2600. The first output signal and the second output signal may be signals generated by the slicer 2600 based on a level difference between the first sample signal Vsp and the second sample signal Vsn. The first output signal and the second output signal will be described in detail with reference to FIG. 9.

Specifically, the slicer 2600 may receive a DFE signal Vdfe generated based on the LSB data of the second data signal and the levels of the data signals received before the second data signal from the second DFE circuit 2800. The slicer 2600 may correct levels of the first output signal and the second output signal based on the DFE signal Vdfe.

In one or more embodiments, the slicer 2600 may determine LSB data of the first data signal based on a result of comparing a level difference between the corrected first output signal and the corrected second output signal with the second reference voltage or the third reference voltage. The slicer 2600 may output the LSB data of the first data signal to the flip-flop 2700.

The second DFE circuit 2800 may generate the DFE signal Vdfe based on MSB data and LSB data respectively corresponding to the LSB data of the second data signal received before the first data signal and the levels of the data signals received before the second data signal. The second DFE circuit 2800 may receive the LSB data of the second data signal from the flip-flop 2700. The second DFE circuit 2800 may receive multi-tap data (Multi-Tap) corresponding to the levels of the data signals received before the second data signal from the slicer 2600. The multi-tap data (Multi-Tap) may include the MSB data and the LSB data respectively corresponding to the levels of the data signals received before the second data signal. In one or more embodiments, the second DFE circuit 2800 may receive multi-tap data (Multi-Tap) including MSB data and LSB data of the third data signal received before the second data signal. In one or more embodiments, the second DFE circuit 2800 may receive multi-tap data (Multi-Tap) including MSB data and LSB data of the fourth data signal received before the third data signal.

In one or more embodiments, the flip-flop 2700 may output MSB data (MSB) and LSB data (LSB) of the first data signal in response to a clock signal CLK. The flip-flop 2700 may output the MSB data (MSB) of the first data signal to the slicer 2600. The slicer 2600 may change a reference voltage for determining the LSB data (LSB) of the first data signal based on the MSB data (MSB) of the first data signal received from the flip-flop 2700 from the first reference voltage to the second reference voltage or the third reference voltage.

The flip-flop 2700 may output the LSB data (LSB) of the first data signal to the second DFE circuit 2800. The second DFE circuit 2800 may generate the DFE signal Vdfe for correcting the level of the data signal following the first data signal based on the LSB (LSB) data of the first data signal.

FIG. 7 is a diagram illustrating a first DFE circuit and a sample/hold circuit according to one or more embodiments.

Referring to FIG. 7, the receiver 2000 may include the first DFE circuit 2400, the sample/hold circuit 2500, and the slicer 2600.

In one or more embodiments, the first DFE circuit 2400 may receive the first differential signal Vdp and the second differential signal Vdn corresponding to a level of the first data signal from the variable gain amplifier 2300 of FIG. 6. In one or more embodiments, the first DFE circuit 2400 may include a first transistor T1, a second transistor T2, a current source I_tr, and an inverter 2410.

In one or more embodiments, the slicer 2600 may determine MSB data (MSB) of the second data signal received before the first data signal, and may output MSB data (MSB) of the second data signal to the first DFE circuit 2400.

A gate of the first transistor T1 may receive the MSB data (MSB) of the second data signal received before the first data signal. A gate of the second transistor T2 may receive inverted data of the MSB data (MSB) of the second data signal through the inverter 2410.

In one or more embodiments, the first DFE circuit 2400 may receive the MSB data (MSB) of the second data signal corresponding to a bit value of 1 from the slicer 2600. The bit value of "1" may correspond to a high level. If the MSB data (MSB) of the second data signal corresponding to the bit value of "1" are received, the first transistor T1 may be turned on. If the first transistor T1 is turned on, a first transistor current Itr_p may be generated at a first node N1. If the first transistor current Itr_p is generated, an amount of a first differential current Idp flowing from the first DFE circuit 2400 to the sample/hold circuit 2500 may decrease. The amount of the first differential current Idp generated by the first differential signal Vdp may be reduced to a first differential correction current Idp_c by the first transistor current Itr_p. If the amount of the first differential current is reduced, a level of the first differential signal Vdp may be lowered to the first differential correction signal Vdp_c. If the MSB data (MSB) of the second data signal corresponding to the bit value of "1" are received, the first transistor T1 may be turned on so that the first DFE circuit 2400 outputs the first differential correction signal Vdp_c lower than the level of the first differential signal Vdp.

In one or more embodiments, if the MSB data (MSB) of the second data signal corresponding to the bit value of "1" are received, the second transistor T2 may be turned off. If the second transistor T2 is turned off, a second transistor current Itr_n may not be generated at the first node N1. If the second transistor current Itr_n is not generated, an amount of a second differential current Idn flowing from the first DFE circuit 2400 to the sample/hold circuit 2500 may be maintained. The amount of the second differential current Idn generated by the second differential signal Vdn may be equal to a second differential correction current Idn_c. If the MSB data (MSB) of the second data signal corresponding to the bit value of "1" are received, the second transistor T2 may be turned off so that the first DFE circuit 2400 outputs the second differential correction signal Vdn_c having the same level as a level of the second differential signal Vdn.

In one or more embodiments, if the MSB data (MSB) of the second data signal corresponding to the bit value of "1" are received, the first DFE circuit 2400 may output the first differential correction signal Vdp_c having a level lower than the level of the first differential signal Vdp, and may output the second differential correction signal Vdn_c having the same level as the level of the second differential signal Vdn. Because the level of the first differential signal is lowered to the first differential correction signal Vdp_c, the level of the first data signal corresponding to a difference between the first differential signal Vdp and the second differential signal Vdn may be lowered to the first bit correction signal corresponding to the difference between the first differential correction signal Vdp_c and the second differential correction signal Vdn_c.

In one or more embodiments, the first DFE circuit 2400 may receive the MSB data (MSB) of the second data signal corresponding to a bit value of "0" from the slicer 2600. The bit value of "0" may correspond to a low level. If the MSB data (MSB) of the second data signal corresponding to the bit value of "0" are received, the first transistor T1 may be turned off. If the first transistor T1 is turned off, the first transistor current Itr_p may not be generated. If the first transistor current Itr_p is not generated, an amount of the first differential current Idp flowing from the first DFE circuit 2400 to the sample/hold circuit 2500 may be maintained. The amount of the first differential current Idp generated by the first differential signal Vdp may be equal to the first differential correction current Idp_c. If the MSB data of the second data signal corresponding to the bit value of "0" are received, the first transistor T1 may be turned off so that the first DFE circuit 2400 outputs the first differential correction signal Vdp_c with the same level as the level of the first differential signal Vdp.

In one or more embodiments, if the MSB data (MSB) of the second data signal corresponding to the bit value of "0" are received, the second transistor T2 may be turned on. If the second transistor T2 is turned on, the second transistor current Itr_n may be generated at a second node N2. If the second transistor current Itr_n is generated, an amount of the second differential current Idn flowing from the first DFE circuit 2400 to the sample/hold circuit 2500 may decrease. The amount of the second differential current Idn generated by the second differential signal Vdn may be reduced to the second differential correction current Idn_c by the second transistor current Itr_n. If an amount of the second differential correction current Idn_c is reduced, the level of the second differential signal Vdn may be lowered to the second differential correction signal Vdn_c. If the MSB data of the second data signal corresponding to the bit value of "0" are received, the second transistor T2 may be turned on so that the first DFE circuit 2400 outputs the second differential correction signal Vdn_c lower than the level of the second differential signal Vdn.

In one or more embodiments, if the MSB data (MSB) of the second data signal corresponding to the bit value of "0" are received, the first DFE circuit 2400 may output the first differential correction signal Vdp_c with the same level as the level of the first differential signal Vdp, and may output the second differential correction signal Vdn_c lower than the level of the second differential signal Vdn. Because the level of the second differential signal Vdn is lowered to the second differential correction signal Vdn_c, the level of the first data signal corresponding to a difference between the first differential signal Vdp and the second differential signal Vdn may be increased to the first bit correction signal corresponding to the difference between the first differential correction signal Vdp_c and the second differential correction signal Vdn_c.

In one or more embodiments, the first DFE circuit 2400 may output the first differential correction signal Vdp_c correcting the level of the first differential signal Vdp and the second differential correction signal Vdn_c correcting the level of the second differential signal Vdn based on the MSB data (MSB) of the second data signal received before the first data signal. The level of the first data signal corresponding to the difference between the first differential signal Vdp and the second differential signal Vdn may increase or decrease to the first bit correction signal corresponding to the difference between the first differential correction signal Vdp_c and the second differential correction signal Vdn_c according to the MSB data (MSB) of the second data signal. The first DFE circuit 2400 may remove the first tap post cursor generated by the MSB data (MSB) of the second data signal by receiving the first data signal and correcting the level of the first data signal based on the MSB data (MSB) of the second data signal received before the first data signal.

In one or more embodiments, the sample/hold circuit 2500 may receive the first differential correction signal Vdp_c and the second differential correction signal Vdn_c. In one or more embodiments, the sample/hold circuit 2500 may include a first switch S1, a second switch S2, a first capacitor Cp, and a second capacitor Cn.

In one or more embodiments, the sample/hold circuit 2500 may sample the first differential correction signal Vdp_c by closing the first switch S1 to charge the first capacitor Cp. The sample/hold circuit 2500 may open the first switch S1, and may hold a charge charged in the first capacitor Cp to output the first sample signal Vsp to the slicer 2600.

In one or more embodiments, the sample/hold circuit 2500 may sample the second differential correction signal Vdn_c by closing the second switch S2 to charge the second capacitor Cn. The sample/hold circuit 2500 may output the second sample signal Vsn to the slicer 2600 by opening the second switch S2 and holding a charge charged in the second capacitor Cn.

Figure 8:
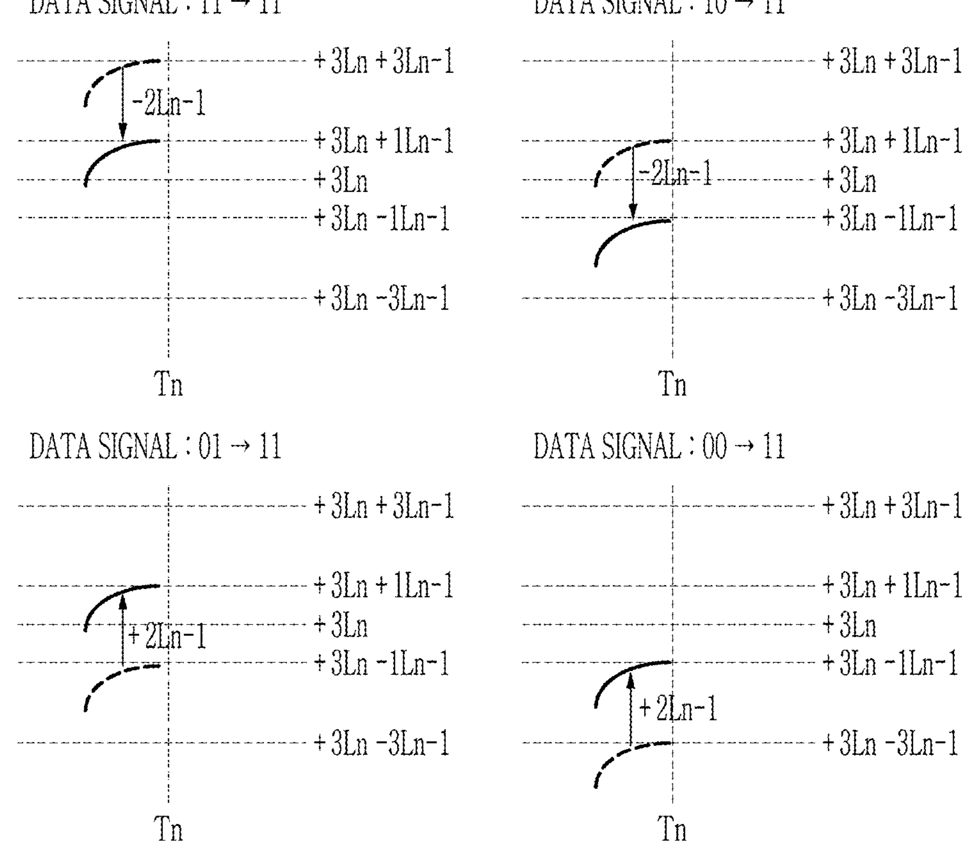
FIG. 8 is a diagram illustrating a first DFE circuit that corrects the level of the data signal according to one or more embodiments.

FIG. 8 is a diagram illustrating a first DFE circuit that corrects the level of the data signal according to one or more embodiments.

Referring to FIG. 8, the first DFE circuit 2400 may receive the first data signal, and may output the first bit correction signal that corrects a level of the first data signal based on MSB data of the second data signal received before the first data signal. The level of the first data signal may correspond to a level difference between the first differential signal Vdp and the second differential signal Vdn. A level of the first bit correction signal may correspond to a level difference between the first differential correction signal Vdp_c and the second differential correction signal Vdn_c. A level of the first differential correction signal may be lower or higher than the first data signal.

In one or more embodiments, after the second data signal with a level corresponding to "11" is received, the level of the first data signal may be higher than +3n level (+3Ln) if the first data signal with a level corresponding to "11" is received. At the time point Tn, the level of the first data signal may be +3n+3n−1 level (+3Ln+3Ln−1).

In one or more embodiments, the first DFE circuit 2400 may turn on the first transistor T1 and may turn off the second transistor T2 based on the MSB data of the second data signal corresponding to the bit value of "1". The first transistor T1 may be turned on so that the first DFE circuit 2400 outputs the first differential correction signal Vdp_c having a lower level than that of the first differential signal Vdp, and the second transistor T2 may be turned off so that the first DFE circuit 2400 outputs the second differential correction signal Vdn_c having the same level as that of the second differential signal Vdn. +3n+3n−1 level (+3Ln+3Ln−1) that is the level of the first data signal corresponding to the first differential signal Vdp and the second differential signal Vdn may be decreased to +3n+1n−1 level (+3Ln+1Ln−1) that is the level of the first bit correction signal corresponding to a difference between the first differential correction signal Vdp_c and the second differential correction signal Vdn_c. The level of the first data signal may be lowered by −2n−1 level (−2Ln−1) by the first DFE circuit 2400.

In one or more embodiments, after the second data signal with a level corresponding to "10" is received, the level of the first data signal may be higher than +3n level (+3Ln) if the first data signal with a level corresponding to "11" is received. At the time point Tn, the level of the first data signal may be +3n+1n−1 level (+3Ln+1Ln−1).

In one or more embodiments, the first DFE circuit 2400 may output the first differential correction signal Vdp_c having a lower level than that of the first differential signal Vdp and may output the second differential correction signal Vdn_c having the same level as that of the second differential signal Vdn based on the MSB data of the second data signal corresponding to the bit value of "1". +3n+1n−1 level (+3Ln+1Ln−1) that is the level of the first data signal corresponding to a difference between the first differential signal Vdp and the second differential signal Vdn may be decreased to +3n−1n−1 level (+3Ln−1Ln−1) that is the level of the first bit correction signal corresponding to a difference between the first differential correction signal Vdp_c and the second differential correction signal Vdn_c. The level of the first data signal may be lowered by −2n−1 level (−2Ln−1) by the first DFE circuit 2400.

In one or more embodiments, after the second data signal with a level corresponding to "01" is received, the level of the first data signal may be lower than +3n level (+3Ln) if the first data signal with a level corresponding to "11" is received. At the time point Tn, the level of the first data signal may be +3n−1n−1 level (+3Ln−1Ln−1).

In one or more embodiments, the first DFE circuit 2400 may turn off the first transistor T1 and may turn on the second transistor T2 based on the MSB data of the second data signal corresponding to the bit value of "0". The first transistor T1 may be turned off so that the first DFE circuit 2400 outputs the first differential correction signal Vdp_c having the same level as that of the first differential signal Vdp, and the second transistor T2 may be turned on so that the first DFE circuit 2400 outputs the second differential correction signal Vdn_c having a lower level than that of the second differential signal Vdn. +3n−1n−1 level (+3Ln−1Ln−1) that is the level of the first data signal corresponding to a difference between the first differential signal Vdp and the second differential signal Vdn may be increased to +3n+1n−1 level (+3Ln+1Ln−1) that is the level of the first bit correction signal corresponding to a difference between the first differential correction signal Vdp_c and the second differential correction signal Vdn_c. The level of the first data signal may be increased by +2n−1 level (+2Ln−1) by the first DFE circuit 2400.

In one or more embodiments, after the second data signal with a level corresponding to "00" is received, the level of the first data signal may be lower than +3n level (+3Ln) if the first data signal with a level corresponding to "11" is received. At the time point Tn, the level of the first data signal may be +3n−3n−1 level (+3Ln−3Ln−1).

In one or more embodiments, the first DFE circuit 2400 may output the first differential correction signal Vdp_c having a lower level than that of the first differential signal Vdp and may output the second differential correction signal Vdn_c having the same level as that of the second differential signal Vdn based on the MSB data of the second data signal corresponding to the bit value of "0". +3n−3n−1 level (+3Ln−3Ln−1) that is the level of the first data signal corresponding to a difference between the first differential signal Vdp and the second differential signal Vdn may be increased to +3n−1n−1 level (+3Ln−1Ln−1) that is the level of the first bit correction signal corresponding to a difference between the first differential correction signal Vdp_c and the second differential correction signal Vdn_c. The level of the first data signal may be increased by +2n−1 level (+2Ln−1) by the first DFE circuit 2400.

In one or more embodiments, the first DFE circuit 2400 may output the first bit correction signal with a level lower than the level of the first data signal based on the MSB data of the second data signal corresponding to the bit value of "1". The first DFE circuit 2400 may output the first bit correction signal with a level higher than the level of the first data signal based on the MSB data of the second data signal corresponding to the bit value of "0".

Figure 9:
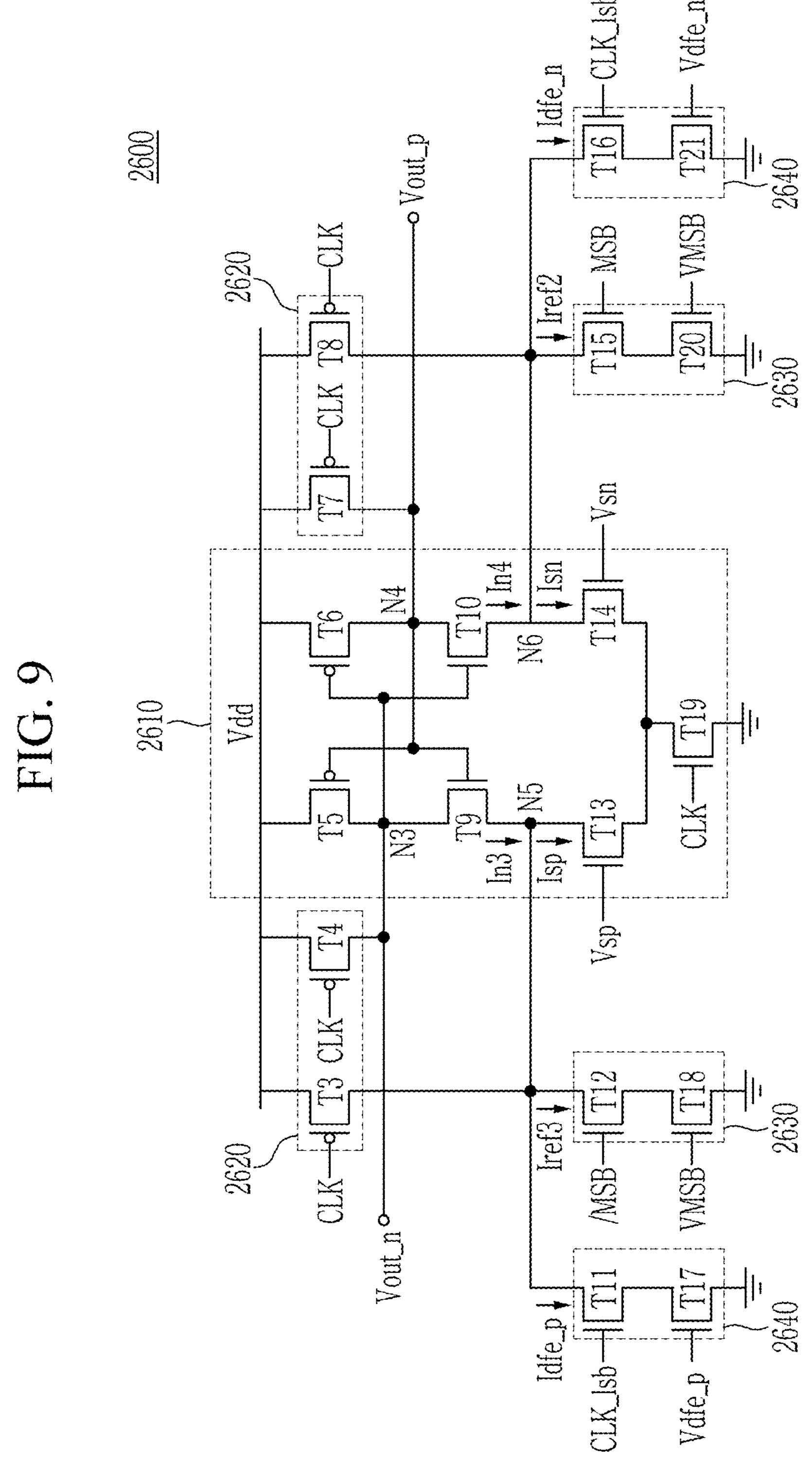
FIG. 9 is a diagram illustrating an operation of a slicer according to one or more embodiments.

FIG. 9 is a diagram illustrating an operation of a slicer according to one or more embodiments.

Referring to FIG. 9, the slicer 2600 may include a sense amplifier 2610, a precharge circuit 2620, a reference voltage correction circuit 2630, and a multi-tap correction circuit 2640.

The precharge circuit 2620 may include a third transistor T3, a fourth transistor T4, a seventh transistor T7, and an eighth transistor T8. Each of the third transistor T3, the fourth transistor T4, the seventh transistor T7, and the eighth transistor T8 may be a p-type metal-oxide-semiconductor (MOS) (PMOS) transistor. The third transistor T3 may be connected to a power source voltage Vdd and a 12th transistor T12. The fourth transistor T4 may be connected to the power source voltage Vdd and a third node N3. The seventh transistor T7 may be connected to the power source voltage Vdd and a fourth node N4. The eighth transistor T8 may be connected to the power source voltage Vdd and a 15th transistor T15. A clock signal CLK may be received at gates of the third transistor T3, the fourth transistor T4, the seventh transistor T7, and the eighth transistor T8.

In one or more embodiments, the precharge circuit 2620 may be connected to the third node N3 and the fourth node N4. In one or more embodiments, the precharge circuit 2620 may precharge voltages of the third node N3 and the fourth node N4 as the power source voltage Vdd in response to a falling edge of the clock signal CLK. If the fourth transistor T4 and the seventh transistor T7 are turned on in response to the clock signal CLK with a low level, a level of a first output signal Vout_p may be increased to the power supply voltage Vdd by the fourth node N4, and a level of a second output signal Vout_n may be increased to the power supply voltage Vdd by the third node N3. In one or more embodiments, the precharge circuit 2620 may precharge voltages of a fifth node N5 and a sixth node N6 to the power source voltage Vdd in response to the falling edge of the clock signal CLK.

In one or more embodiments, the sense amplifier 2610 may receive the first sample signal Vsp and the second sample signal Vsn from the sample/hold circuit 2500 in response to a rising edge of the clock signal CLK. The sense amplifier 2610 may generate the first output signal Vout_p and the second output signal Vout_n based on a difference between the first sample signal Vsp and the second sample signal Vsn, and may determine MSB data of the first data signal based on a result of comparing a difference between the first output signal Vout_p and the second output signal Vout_n with a first reference voltage. In one or more embodiments, the first reference voltage may correspond to a 0 level.

In one or more embodiments, the sense amplifier 2610 may include a fifth transistor T5, a sixth transistor T6, a ninth transistor T9, a tenth transistor T10, a 13th transistor T13, a 14th transistor T14, and a 19th transistor T19. Each of the fifth transistor T5 and the sixth transistor T6 may be a PMOS transistor. Each of the ninth transistor T9, the tenth transistor T10, the 13th transistor T13, the 14th transistor T14, and the 19th transistor T19 may be an n-type MOS (NMOS) transistor. The fifth transistor T5 may be connected to the power source voltage Vdd and the ninth transistor T9. The sixth transistor T6 may be connected to the power source voltage Vdd and the tenth transistor T10. The ninth transistor T9 may be connected to the fifth transistor T5 and the 13th transistor T13. The tenth transistor T10 may be connected to the sixth transistor T6 and the 14th transistor T14. The 13th transistor T13 may be connected to the ninth transistor T9 and the 19th transistor T19. The 14th transistor T14 may be connected to the tenth transistor T10 and the 19th transistor T19. The 19th transistor T19 may be connected to the 13th transistor T13 and the 14th transistor T14 and a ground.

Gates of the fifth transistor T5 and the ninth transistor T9 may be connected to the fourth node N4. Gates of the sixth transistor T6 and the tenth transistor T10 may be connected to the third node N3. The first sample signal Vsp may be received at a gate of the 13th transistor T13. The second sample signal Vsn may be received at a gate of the 14th transistor T14. The clock signal CLK may be received at a gate of the 19th transistor T19.

In one or more embodiments, the ninth transistor T9 and the tenth transistor T10 may be turned on by the first output signal Vout_p and the second output signal Vout_n rising to the power source voltage Vdd. If the ninth transistor T9 is turned on, a third current In3 may be generated at the fifth node N5. If the tenth transistor T10 is turned on, a fourth current In4 may be generated at the sixth node N6.

In one or more embodiments, the 13th transistor T13 may be turned on in response to the first sample signal Vsp. If the 13th transistor T13 is turned on, a first sample current Isp may be generated. The 14th transistor T14 may be turned on in response to the second sample signal Vsn. If the 14th transistor T14 is turned on, a second sample current Isn may be generated. The 19th transistor T19 may be turned on according to the clock signal CLK with a high level. The first sample current Isp and the second sample current Isn may flow to the 19th transistor T19 connected to the ground.

In one or more embodiments, if the first sample current Isp is generated, a voltage of the third node N3 may be lowered. If the second sample current Isn is generated, a voltage of the fourth node N4 may be lowered. If a level of the first sample signal Vsp is higher than a level of the second sample signal Vsn, a speed at which the voltage of the third node N3 is lowered may be faster than a speed at which the voltage of the fourth node N4 is lowered. If the voltage of the third node N3 decreases before the voltage of the fourth node N4, the sixth transistor T6 connected to the third node N3 may be turned on. If the sixth transistor T6 is turned on, the voltage of the fourth node N4 may rise by the power source voltage Vdd. That is, if the level of the first sample signal Vsp is higher than the level of the second sample signal Vsn, the voltage of the third node N3 may be lowered, and the voltage of the fourth node N4 may be increased. If the voltage of the third node N3 decreases, a level of the second output signal Vout_n may decrease, and if the voltage of the fourth node N4 increases, a level of the first output signal Vout_p may increase. If a difference between the level of the first output signal Vout_p and the level of the second output signal Vout_n corresponds to a positive level higher than the first reference voltage, the slicer 2600 may determine that a bit value of the MSB data of the first data signal corresponds to “1”.

In one or more embodiments, if the level of the first sample signal Vsp is lower than the level of the second sample signal Vsn, the speed at which the voltage of the third node N3 is lowered may be slower than the speed at which the voltage of the fourth node N4 is lowered. If the voltage of the fourth node N4 decreases before the voltage of the third node N3, the fifth transistor T5 connected to the fourth node N4 may be turned on. If the fifth transistor T5 is turned on, the voltage of the third node N3 may rise by the power source voltage Vdd. That is, if the level of the first sample signal Vsp is lower than the level of the second sample signal Vsn, the voltage of the third node N3 may increase and the voltage of the fourth node N4 may decrease. If the voltage of the third node N3 increases, the level of the second output signal Vout_n may increase, and if the voltage of the fourth node N4 decreases, the level of the first output signal Vout_p may decrease. If the difference between the level of the first output signal Vout_p and the level of the second output signal Vout_n corresponds to a negative level lower than the first reference voltage, the slicer 2600 may determine that the bit value of the MSB data of the first data signal corresponds to “0”.

In one or more embodiments, the precharge circuit 2620 may precharge the voltage of the third node N3 and the voltage of the fourth node N4 to the power source voltage Vdd in response to the falling edge of the clock signal CLK after the MSB data of the first data signal are determined.

In one or more embodiments, after the MSB data of the first data signal are determined, the multi-tap correction circuit 2640 may receive the DFE signal Vdfe generated based on LSB data of the second data signal received before the first data signal and levels of data signals received before the second data signal from the second DFE circuit 2800, and may correct the level of the first output signal Vout_p and the level of the second output signal Vout_n based on the DFE signal Vdfe.

In one or more embodiments, the multi-tap correction circuit 2640 may include an 11th transistor T11, a 16th transistor T16, a 17th transistor T17, and a 21st transistor T21. The 11th transistor T11 may be connected to the fifth node N5 and the 17th transistor T17. The 16th transistor T16 may be connected to the sixth node N6 and the 21st transistor T21. The 17th transistor T17 may be connected to the 11th transistor T11 and the ground. The 21st transistor T21 may be connected to the 16th transistor T16 and the ground.

In one or more embodiments, gates of the 11th transistor T11 and the 16th transistor T16 may receive an LSB clock signal CLK_Isb. The LSB clock signal CLK_Isb may have a high level when LSB data of the first data signal are determined. A gate of the 17th transistor T17 may receive a first DFE signal Vdfe_p. A gate of the 21st transistor T21 may receive a second DFE signal Vdfe_n. The first DFE signal Vdfe_p and the second DFE signal Vdfe_n may be received from the second DFE circuit 2800.

In one or more embodiments, the multi-tap correction circuit 2640 may receive the first DFE signal Vdfe_p from the second DFE circuit 2800 if a bit value of the LSB data of the second data signal received before the first data signal corresponds to “0”. If the 11th transistor T11 is turned on according to the LSB clock signal CLK_Isb and the 17th transistor T17 is turned on according to the first DFE signal Vdfe_p, a first DFE current Idfe_p may be generated. If the first DFE current Idfe_p is generated, an amount of the first sample current Isp generated by the first sample signal Vsp may decrease. If the amount of the first sample current Isp decreases, the voltage of the third node N3 may decrease. If the voltage of the third node N3 decreases, the level of the second output signal Vout_n may decrease. If the level of the second output signal Vout_n decreases, the difference between the level of the first output signal Vout_p and the level of the second output signal Vout_n may increase.

In one or more embodiments, if the bit value of the LSB data of the second data signal received before the first data signal corresponds to “0”, the slicer 2600 may receive the first DFE signal Vdfe_p from the second DFE circuit 2800, and may correct a level of a second output signal Vout_p based on the first DFE signal Vdfe_p. The level of the second output signal Vout_p may be lowered depending on the first DFE signal Vdfe_p.

In one or more embodiments, the multi-tap correction circuit 2640 may receive the second DFE signal Vdfe_n from the second DFE circuit 2800 if the bit value of the LSB data of the second data signal received before the first data signal corresponds to “1”. If the 16th transistor T16 is turned on according to the LSB clock signal CLK_Isb and the 21st transistor T21 is turned on according to the second DFE signal Vdfe_n, a second DFE current Idfe_n may be generated. If the second DFE current Idfe_n is generated, an amount of the second sample current Isn generated by the second sample signal Vsn may decrease. If the amount of the second sample current Isn decreases, the voltage of the fourth node N4 may decrease. If the voltage of the fourth node N4 decreases, the level of the first output signal Vout_p may decrease. If the level of the first output signal Vout_p decreases, the difference between the level of the first output signal Vout_p and the level of the second output signal Vout_n may decrease.

In one or more embodiments, if the bit value of the LSB data of the second data signal received before the first data signal corresponds to “1”, the slicer 2600 may receive the second DFE signal Vdfe_n from the second DFE circuit 2800, and may correct the level of the first output signal Vout_p based on the second DFE signal Vdfe_n. The level of the first output signal Vout_p may be lowered depending on the second DFE signal Vdfe_n.

In one or more embodiments, the multi-tap correction circuit 2640 may receive the first DFE signal Vdfe_p and the second DFE signal Vdfe_n generated based on the LSB data of the second data signal received before the first data signal and the levels of the data signals received before the second data signal from the second DFE circuit 2800. The multi-tap correction circuit 2640 may correct the level of the second output signal Vout_n based on the first DFE signal Vdfe_p, and may correct the level of the first output signal Vout_p based on the second DFE signal Vdfe_n. The difference between the level of the first output signal Vout_p and the level of the second output signal Vout_n may increase or decrease depending on the first DFE signal Vdfe_p and the second DFE signal Vdfe_n. If a difference between the first DFE signal Vdfe_p and the second DFE signal Vdfe_n is a positive level, a level difference between the first output signal Vout_p and the second output signal Vout_n may increase. If the difference between the first DFE signal Vdfe_p and the second DFE signal Vdfe_n is a negative level, the level difference between the first output signal Vout_p and the second output signal Vout_n may decrease.

In one or more embodiments, after the MSB data of the first data signal are determined, the reference voltage correction circuit 2630 may change the first reference voltage to the second reference voltage higher than the first reference voltage or the third reference voltage lower than the first reference voltage based on the MSB data of the first data signal. The sense amplifier 2610 may determine the LSB data of the first data signal based on a result of comparing a level difference between the first output signal and the second output signal corrected by the first DFE signal Vdfe_p and the second DFE signal Vdfe_n with the second reference voltage or the third reference voltage.

Specifically, the reference voltage correction circuit 2630 may include the 12th transistor T12, the 15th transistor T15, an 18th transistor T18, and a 20th transistor T20. The 12th transistor T12 may be connected to the third transistor T3 and the 18th transistor T18. The 12th transistor T12 may be connected to the fifth node N5. The 15th transistor T15 may be connected to the eighth transistor T8 and the 20th transistor T20. The 15th transistor T15 may be connected to the sixth node N6. The 18th transistor T18 may be connected to the 12th transistor T12 and the ground. The 20th transistor T20 may be connected between the 15th transistor T15 and the ground.

In one or more embodiments, a gate of the 12th transistor T12 may receive data (/MSB) in which the MSB data of the first data signal is inverted. A gate of the 15th transistor T15 may receive MSB data (MSB) of the first data signal.

In one or more embodiments, if the bit value of the MSB data of the first data signal corresponds to "1", the 12th transistor T12 may be turned off, and the 15th transistor T15 may be turned on. The 18th transistor T18 and the 20th transistor T20 may be turned on if the MSB data of the first data signal VMSB is received. If the 15th transistor T15 and the 20th transistor T20 are turned on, a second reference current Iref2 may be generated. If the second reference current Iref2 is generated, an amount of the second sample current Isn flowing in the sixth node N6 may decrease. If the amount of the second sample current Isn decreases, the voltage of the fourth node N4 may decrease. If the voltage of the fourth node N4 decreases, the level of the first output signal Vout_p may decrease. If a difference between the level of the first output signal Vout_p lowered by the second reference current Iref2 and the level of the second output signal Vout_n corresponds to a positive level, the slicer 2600 may determine that a bit value of the LSB data of the first data signal corresponds to "1". If the difference between the level of the first output signal Vout_p lowered by the second reference current Iref2 and the level of the second output signal Vout_n corresponds to a negative level, the slicer 2600 may determine that the bit value of the LSB data of the first data signal corresponds to "0".

In one or more embodiments, if the bit value of the MSB data of the first data signal corresponds to "0", the 12th transistor T12 may be turned on, and the 15th transistor T15 may be turned off. If the 12th transistor T12 and the 18th transistor T18 are turned on, a third reference current Iref3 may be generated. If the third reference current Iref3 is generated, an amount of the first sample current Isp flowing at the fifth node N5 may decrease. If the amount of the first sample current Isp decreases, the voltage of the third node N3 may decrease. If the voltage of the third node N3 decreases, the level of the second output signal Vout_n may decrease. If a difference between the level of the first output signal Vout_p and the level of the second output signal Vout_n lowered by the third reference current Iref3 corresponds to a positive level, the slicer 2600 may determine that the bit value of the LSB data of the first data signal corresponds to "1". If the difference between the level of the first output signal Vout_p and the level of the second output signal Vout_n lowered by the third reference current Iref3 corresponds to a negative level, the slicer 2600 may determine that the bit value of the LSB data of the first data signal corresponds to "0".

Figure 10:
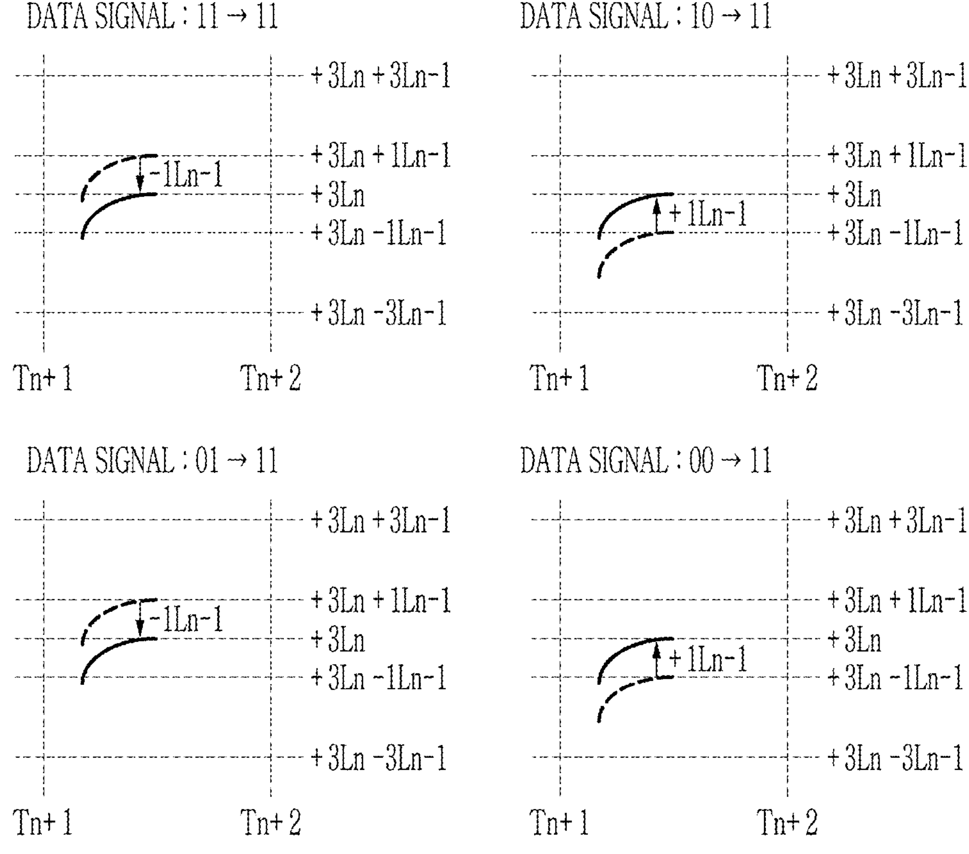
FIG. 10 is a diagram illustrating a slicer that corrects the level of the data signal according to one or more embodiments.

FIG. 10 is a diagram illustrating a slicer that corrects the level of the data signal according to one or more embodiments.

Referring to FIG. 10, the slicer 2600 may receive the DFE signal from the second DFE circuit 2800, and may generate the second bit correction signal by correcting a level of the first bit correction signal based on the DFE signal. The first bit correction signal may correspond to a level difference between the first differential correction signal Vdp_c and the second differential correction signal Vdn_c.

The second bit correction signal may correspond to a level difference between the first output signal Vout_p corrected by the DFE signal and the second output signal Vout_n corrected by the DFE signal. A level of the second bit correction signal may be higher or lower than that of the first bit correction signal.

In one or more embodiments, after the second data signal with a level corresponding to "11" is received, the slicer 2600 may receive the second DFE signal Vdfe_n from the second DFE circuit 2800 if the first data signal with a level corresponding to "11" is received. The slicer 2600 may turn on the 16th transistor T16 and the 21st transistor T21 based on the second DFE signal Vdfe_n. If the 16th transistor T16 and the 21st transistor T21 are turned on, the level of the first output signal Vout_p may be lowered. +3n+1n−1 level (+3Ln+1Ln−1) that is the level of the first bit correction signal corresponding to a level difference between the first differential correction signal Vdp_c and the second differential correction signal Vdn_c may be lowered to +3n level (+3Ln) that is the level of the second bit correction signal corresponding to a level difference between the first output signal Vout_p and the second output signal Vout_n because the level of the first output signal Vout_p is lowered. The level of the first bit correction signal may be lowered by −1n−1 level (−1Ln−1) by the second DFE signal Vdfe_n.

In one or more embodiments, after the second data signal with a level corresponding to "10" is received, the slicer 2600 may receive the first DFE signal Vdfe_p from the second DFE circuit 2800 if the first data signal with a level corresponding to "11" is received. The slicer 2600 may turn on the 11th transistor T11 and the 17th transistor T17 based on the first DFE signal Vdfe_p. If the 11th transistor T11 and the 17th transistor T17 are turned on, the level of the second output signal Vout_n may be lowered. +3n−1n−1 level (+3Ln−1Ln−1) that is the level of the first bit correction signal corresponding to a level difference between the first differential correction signal Vdp_c and the second differential correction signal Vdn_c may be increased to +3n level (+3Ln) that is the level of the second bit correction signal corresponding to a level difference between the first output signal Vout_p and the second output signal Vout_n because the level of the second output signal Vout_n is lowered. The level of the first bit correction signal may be increased by +1n−1 level (+1Ln−1) by the first DFE signal Vdfe_p.

In one or more embodiments, after the second data signal with a level corresponding to "01" is received, the slicer 2600 may receive the second DFE signal Vdfe_n from the second DFE circuit 2800 if the first data signal with a level corresponding to "11" is received. The level of the first output signal Vout_p may be lowered because the second DFE signal Vdfe_n is received.

+3n+1n−1 level (+3Ln+1Ln−1) that is the level of the first bit correction signal corresponding to a level difference between the first differential correction signal Vdp_c and the second differential correction signal Vdn_c may be lowered to +3n level (+3Ln) that is the level of the second bit correction signal corresponding to a level difference between the first output signal Vout_p and the second output signal Vout_n because the level of the first output signal Vout_p is lowered. The level of the first bit correction signal may be lowered by −1n−1 level (−1Ln−1) by the second DFE signal Vdfe_n.

In one or more embodiments, after the second data signal with a level corresponding to “00” is received, the slicer 2600 may receive the first DFE signal Vdfe_p from the second DFE circuit 2800 if the first data signal with a level corresponding to “11” is received. The level of the second output signal Vout_n may be lowered because the first DFE signal Vdfe_p is received.

+3n−1n−1 level (+3Ln−1Ln−1) that is the level of the first bit correction signal corresponding to a level difference between the first differential correction signal Vdp_c and the second differential correction signal Vdn_c may be increased to +3n level (+3Ln) that is the level of the second bit correction signal corresponding to a level difference between the first output signal Vout_p and the second output signal Vout_n because the level of the second output signal Vout_n is lowered. The level of the first bit correction signal may be increased by +1n−1 level (+1Ln−1) by the first DFE signal Vdfe_p.

In one or more embodiments, the slicer 2600 may generate the second bit correction signal with a lower level than that of the first bit correction signal based on an LSB data signal of the second data signal corresponding to a bit value of “1”. The second bit correction signal may correspond to a level difference between the first output signal and the second output signal. The slicer 2600 may generate the second bit correction signal having a higher level than the first bit correction signal based on the LSB data signal of the second data signal corresponding to a bit value of “0”.

In one or more embodiments, the slicer 2600 may remove the first tap post cursor generated by LSB data of the second data signal by correcting a level of the first data signal based on the LSB data of the second data signal received before the first data signal.

Figure 11:
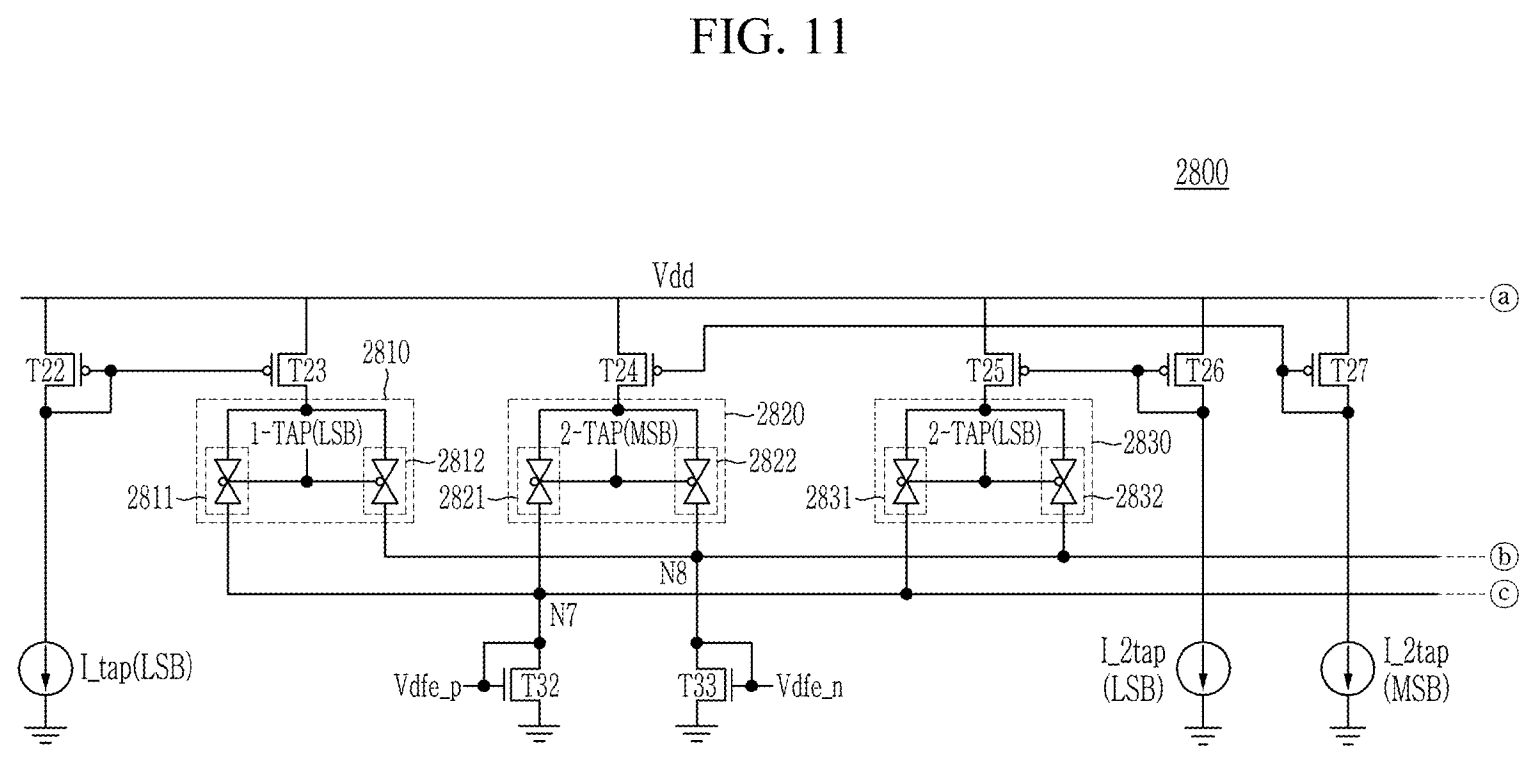
Figure 12:
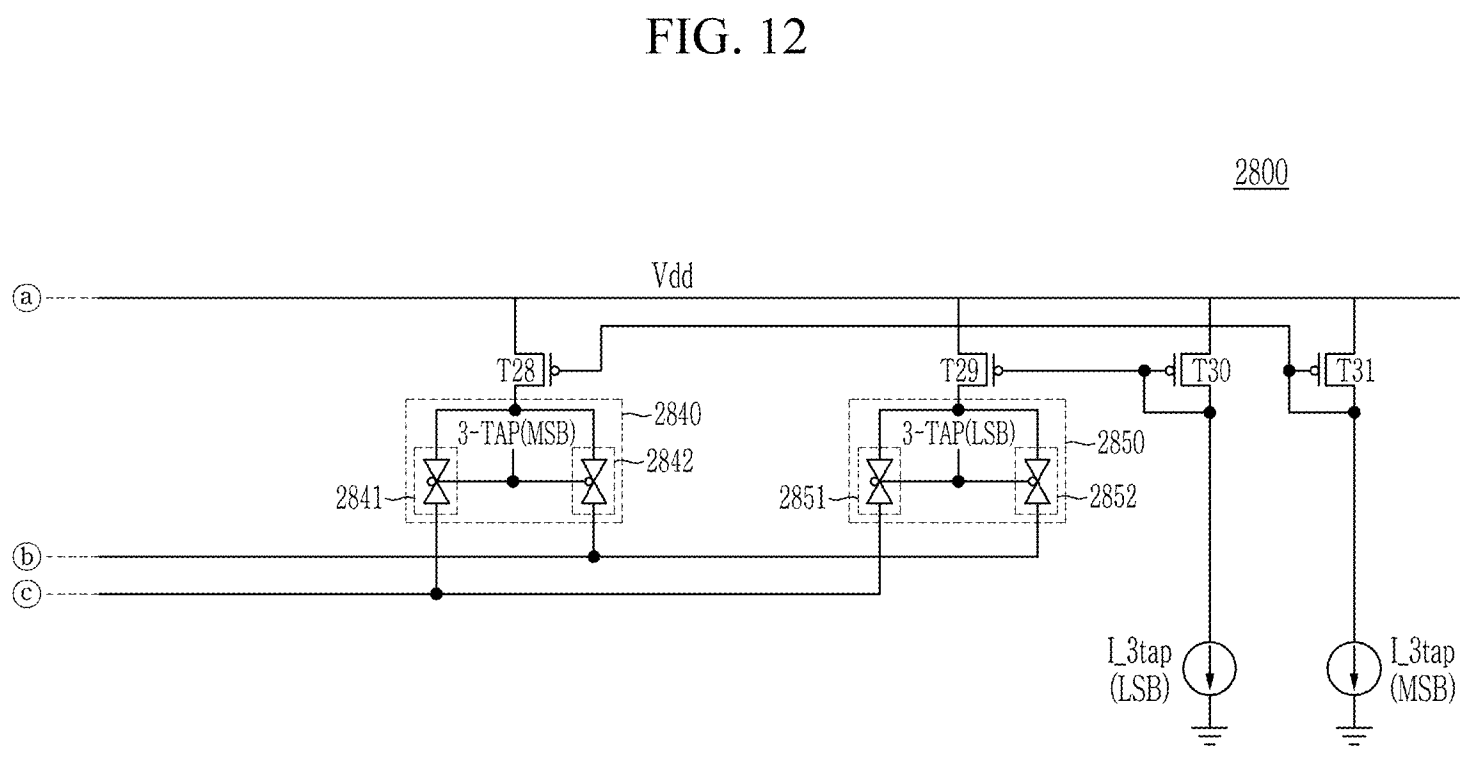

FIG. 11 and FIG. 12 are diagrams illustrating a second DFE circuit according to one or more embodiments.

Referring to FIG. 11 and FIG. 12, the second DFE circuit 2800 may generate a multi-tap current based on multi-tap data respectively corresponding to LSB data (1-TAP(LSB)) of the second data signal received before the first data signal and levels of data signals received before the second data signal, and may generate a first DFE signal Vdfe_p and the second DFE signal Vdfe_n based on the multi-tap current. The multi-tap data may include MSB data (2-TAP(MSB)) and the LSB data (2-TAP(LSB)) of the third data signal received before the second data signal. The multi-tap data may include MSB data (3-TAP(MSB)) and LSB data (3-TAP(LSB)) of the fourth data signal received before the third data signal. The multi-tap current may include a first tap LSB current (I_1tap(LSB)) generated based on the LSB data (1-TAP(LSB)) of the second data signal, a second tap MSB current (I_2tap(MSB)) and a second tap LSB current (I_2tap(LSB)) generated based on the MSB data (2-TAP (MSB)) and the LSB data (2-TAP(LSB)) of the third data signal, and a third tap MSB current (I_3tap(MSB)) and a third tap LSB current (I_3tap(LSB)) generated based on the MSB data (3-TAP(MSB)) and the LSB data (3-TAP(LSB)) of the fourth data signal.

In one or more embodiments, the second DFE circuit 2800 may include 22nd to 33rd transistors (T22-T33), a first tap LSB current source (I_1tap(LSB)), a second tap MSB current source (I_2tap(MSB)), a second tap LSB current source (I_2tap(LSB)), a third tap MSB current source (I_3tap(MSB)), a third tap LSB current source (I_3tap (LSB)), a first tap LSB circuit 2810, a second tap MSB circuit 2820, a second tap LSB circuit 2830, a third tap MSB circuit 2840, and a third tap LSB circuit 2850.

In one or more embodiments, the 22nd to 31st transistors T22-T31 may be NMOS transistors. The 32nd and 33rd transistors T32 and T33 may be NMOS transistors. The 22nd transistor T22 may be connected to the power source voltage Vdd and the first tap LSB current source (I_1tap(LSB)). A gate of the 22nd transistor T22 may be connected to a gate of the 23rd transistor T23. The 23rd transistor T23 may be connected to the power source voltage Vdd and the first tap LSB circuit 2810.

The 24th transistor T24 may be connected to the power source voltage Vdd and the second tap MSB circuit 2820. A gate of the 24th transistor T24 may be connected to a gate of the 27th transistor T27. The 27th transistor T27 may be connected to the power source voltage Vdd and the second tap MSB current source (I_2tap(MSB)).

The 25th transistor T25 may be connected to the power source voltage Vdd and the second tap LSB circuit 2830. A gate of the 25th transistor T25 may be connected to a gate of the 26th transistor T26. The 26th transistor T26 may be connected to the power source voltage Vdd and the second tap LSB current source (I_2tap(LSB)).

The 28th transistor T28 may be connected to the power source voltage Vdd and the third tap MSB circuit 2840. A gate of the 28th transistor T28 may be connected to a gate of the 31st transistor T31. The 31st transistor T31 may be connected to the power source voltage Vdd and the third tap MSB current source (I_3tap(MSB)).

The 29th transistor T29 may be connected to the power source voltage Vdd and the third tap LSB circuit 2850. A gate of the 29th transistor T29 may be connected to a gate of the 30th transistor T30. The 30th transistor T30 may be connected to the power source voltage Vdd and the third tap LSB current source (I_3tap(LSB)).

The first tap LSB circuit 2810, the second tap MSB circuit 2820, the second tap LSB circuit 2830, the third tap MSB circuit 2840, and the third tap LSB circuit 2850 may be connected to the 32nd transistor T32 through a seventh node ND7. The first DFE signal Vdfe_p may be output through a gate of the 32nd transistor T32. The first tap LSB circuit 2810, the second tap MSB circuit 2820, the second tap LSB circuit 2830, the third tap MSB circuit 2840, and the third tap LSB circuit 2850 may be connected to the 33rd transistor T33 through an eighth node N8. The second DFE signal Vdfe_n may be output through a gate of the 33rd transistor T33.

The first tap LSB circuit 2810 may include a third switch 2811 and a fourth switch 2812. The second tap MSB circuit 2820 may include a fifth switch 2821 and a sixth switch 2822. The second tap LSB circuit 2830 may include a seventh switch 2831 and an eighth switch 2832. The third tap MSB circuit 2840 may include a ninth switch 2841 and a tenth switch 2842. The third tap LSB circuit 2850 may include an 11th switch 2851 and a 12th switch 2852.

In one or more embodiments, the first tap LSB circuit 2810 may receive the LSB data (1-TAP(LSB)) of the second data signal received before the first data signal. The third switch 2811 and th fourth switch 2812 may be turned on or off depending on a bit value of the LSB data (1-TAP(LSB)) of the second data signal.

In one or more embodiments, if the bit value of the LSB data (1-TAP LSB)) of the second data signal corresponds to “1”, the third switch 2811 may be turned on, and the fourth switch 2812 may be turned off. If the third switch 2811 is turned on, the first tap LSB current (I_1tap(LSB)) may be generated at a seventh node N7. The second DFE circuit 2800 may generate the first DFE signal Vdfe_p based on the first tap LSB current (I_1tap(LSB)), and may output the first DFE signal Vdfe_p to the slicer 2600.

In one or more embodiments, if the bit value of the LSB data (1-TAP(LSB)) of the second data signal corresponds to “0”, the third switch 2811 may be turned off, and the fourth switch 2812 may be turned on. If the fourth switch 2812 is turned on, the first tap LSB current (I_1tap(LSB)) may be generated at the eighth node N8. The second DFE circuit 2800 may generate the second DFE signal Vdfe_n based on the first tap LSB current (I_1tap(LSB)), and may output the second DFE signal Vdfe_n to the slicer 2600.

In one or more embodiments, the second tap MSB circuit 2820 may receive the MSB data (2-TAP(MSB)) of the third data signal received before the second data signal, and the second tap LSB circuit 2830 may receive the LSB data (2-TAP(LSB)) of the third data signal. The fifth switch 2821 and the sixth switch 2822 included in the second tap MSB circuit 2820 may be turned on or off depending on a bit value of the MSB data (2-TAP(MSB)) of the third data signal. The seventh switch 2831 and the eighth switch 2832 included in the second tap LSB circuit 2830 may be turned on or off depending on a bit value of the LSB data (2-TAP(LSB)) of the third data signal.

In one or more embodiments, if the MSB data (2-TAP (MSB)) and the LSB data (2-TAP(LSB)) of the third data signal are “00” corresponding to −3 level, the fifth switch 2821 and the seventh switch 2831 may be turned on, and the sixth switch 2822 and the eighth switch 2832 may be turned off. If the fifth switch 2821 and the seventh switch 2831 are turned on, a current that is a sum of the second tap MSB current (I_2tap(MSB)) and the second tap LSB current (I_2tap(LSB)) may be generated at the seventh node N7. The second DFE circuit 2800 may generate the first DFE signal Vdfe_p based on the current that is the sum of the second tap MSB current (I_2tap(MSB)) and the second tap LSB current (I_2tap(LSB)), and may output the first DFE signal Vdfe_p to the slicer 2600. If the first DFE signal Vdfe_p generated based on the current that is the sum of the second tap MSB current (I_2tap(MSB)) and the second tap LSB current (I_2tap(LSB)) is received, the slicer 2600 may increase a level difference between the first output signal Vout_p and the second output signal Vout_n.

In one or more embodiments, if the MSB data (2-TAP (MSB)) and the LSB data (2-TAP(LSB)) of the third data signal are “01” corresponding to −1 level, the fifth switch 2821 and the eighth switch 2832 may be turned on, and the sixth switch 2822 and the seventh switch 2831 may be turned off. If the fifth switch 2821 is turned on, the second tap MSB current (I_2tap(MSB)) may be generated at the seventh node N7. If the eighth switch 2832 is turned on, the second tap LSB current (I_2tap(LSB)) may be generated at the eighth node N8.

The second DFE circuit 2800 may generate the first DFE signal Vdfe_p based on the second tap MSB current (I_2tap (MSB)), may generate the second DFE signal Vdfe_n based on the second tap LSB current (I_2tap(LSB)), and may output the first DFE signal Vdfe_p and the second DFE signal Vdfe_n to the slicer 2600.

In one or more embodiments, an amount of the second tap MSB current (I_2tap(MSB)) may be greater than an amount of the first tap LSB current (I_1tap(LSB)). In one or more embodiments, if the amount of the second tap MSB current (I_2tap(MSB)) is greater than the amount of the first tap LSB current (I_1tap(LSB)), a level of the first DFE signal Vdfe_p may be higher than a level of the second DFE signal Vdfe_n. If a level difference between the first DFE signal Vdfe_p and the second DFE signal Vdfe_n is a positive level, the level difference between the first output signal Vout_p and the second output signal Vout_n generated by the slicer 2600 may increase. If the first DFE signal Vdfe_p generated based on the second tap MSB current (I_2tap (MSB)) and the second DFE signal Vdfe_n generated based on the second tap LSB current (I_2tap(LSB)) are received, the slicer 2600 may increase the level difference between the first output signal Vout_p and the second output signal Vout_n.

In one or more embodiments, if the MSB data (2-TAP (MSB)) and the LSB data (2-TAP(LSB)) of the third data signal are “10” corresponding to +1 level, the sixth switch 2822 and the seventh switch 2831 may be turned on, and the fifth switch 2821 and the eighth switch 2832 may be turned off. If the sixth switch 2822 is turned on, the second tap MSB current (I_2tap(MSB)) may be generated at the eighth node N8. If the seventh switch 2831 is turned on, the second tap LSB current (I_2tap(LSB)) may be generated at the seventh node N7.

The second DFE circuit 2800 may generate the first DFE signal Vdfe_p based on the second tap LSB current (I_2tap (LSB)), may generate the second DFE signal Vdfe_n based on the second tap MSB current (I_2tap(MSB)), and may output the first DFE signal Vdfe_p and the second DFE signal Vdfe_n to the slicer 2600.

In one or more embodiments, if the amount of the second tap MSB current (I_2tap(MSB)) is greater than an amount of the second tap LSB current (I_2tap(LSB)), the level of the first DFE signal Vdfe_p may be lower than the level of the second DFE signal Vdfe_n. If the level difference between the first DFE signal Vdfe_p and the second DFE signal Vdfe_n is a negative level, the level difference between the first output signal Vout_p and the second output signal Vout_n generated by the slicer 2600 may be reduced. If the first DFE signal Vdfe_p generated based the second tap LSB current (I_2tap(LSB)) and the second DFE signal Vdfe_n generated based on the second tap MSB current (I_2tap (MSB)) are received, the slicer 2600 may reduce the level difference between the first output signal Vout_p and the second output signal Vout_n.

In one or more embodiments, if the MSB data (2-TAP (MSB)) and the LSB data (2-TAP(LSB)) of the third data signal are “11” corresponding to +3 level, the sixth switch 2822 and the eighth switch 2832 may be turned on, and the fifth switch 2821 and the seventh switch 2831 may be turned off. If the sixth switch 2822 and the eighth switch 2832 are turned on, the current that is the sum of the second tap MSB current (I_2tap(MSB)) and the second tap LSB current (I_2tap(LSB)) may be generated at the eighth node N8.

The second DFE circuit 2800 may generate the second DFE signal Vdfe_n based on the current that is the sum of the second tap MSB current (I_2tap(MSB)) and the second tap LSB current (I_2tap(LSB)), and may output the second DFE signal Vdfe_n to the slicer 2600. If the second DFE signal Vdfe_n generated based on the current that is the sum of the second tap MSB current (I_2tap(MSB)) and the second tap LSB current (I_2tap(LSB)) is received, the slicer 2600 may reduce the level difference between the first output signal Vout_p and the second output signal Vout_n.

In one or more embodiments, the third tap MSB circuit 2840 and the third tap LSB circuit 2850 may operate in the same manner as those of the second tap MSB circuit 2820 and the second tap LSB circuit 2830. In one or more embodiments, the third tap MSB circuit 2840 and the third tap LSB circuit 2850 may generate the third tap MSB current (I_3tap(MSB)) and the third tap LSB current (I_3tap(LSB)) based on the MSB data (3-TAP(MSB)) and the LSB data (3-TAP(LSB)) of the fourth data signal received before the third data signal, and may generate the first DFE signal Vdfe_p and/or the second DFE signal Vdfe_n based on the third tap MSB current (I_3tap(MSB)) and the third tap LSB current (I_3tap(LSB)). The second DFE circuit 2800 may output the first DFE signal Vdfe_p and/or the second DFE signal Vdfe_n generated based on the third tap MSB current (I_3tap(MSB)) and the third tap LSB current (I_3tap(LSB)) to the slicer 2600. The slicer 2600 may increase or decrease the level difference between the first output signal Vout_p and the second output signal Vout_n based on the first DFE signal Vdfe_p and/or the second DFE signal Vdfe_n.

In one or more embodiments, the second DFE circuit 2800 may generate the first tap LSB current (I_1tap(LSB)) based on the LSB data (1-TAP(LSB)) of the second data signal received before the first data signal, may generate the second tap MSB current (I_2tap(MSB)) and the second tap LSB current (I_2tap(LSB)) based on the MSB data (2-TAP (MSB)) and the LSB data (2-TAP(LSB)) of the third data signal received before the second data signal, and may generate the third tap MSB current (I_3tap(MSB)) and the third tap LSB current (I_3tap(LSB)) based on the MSB data (3-TAP(MSB)) and the LSB data (3-TAP(LSB)) of the fourth data signal received before the third data signal. The second DFE circuit 2800 may generate the first DFE signal Vdfe_p and the second DFE signal Vdfe_n based on the first tap LSB current (I_1tap(LSB)), the second tap MSB current (I_2tap(MSB)), the third tap MSB current (I_3tap(MSB)), and the third tap LSB current (I_3tap(LSB)), and may output the first DFE signal Vdfe_p and the second DFE signal Vdfe_n to the slicer 2600. The slicer 2600 may correct the level of the first output signal Vout_p and the level of the second output signal Vout_n based on the first DFE signal Vdfe_p and the second DFE signal Vdfe_n. The level difference between the first output signal Vout_p and the second output signal Vout_n may increase or decrease by the first DFE signal Vdfe_p and the second DFE signal Vdfe_n.

In one or more embodiments, the receiver 2000 may generate the first DFE signal Vdfe_p and the second DFE signal Vdfe_n based on levels of data signals received before the first data signal, and may correct the levels of the first output signal Vout_p and the second output signal Vout_n generated by the slicer 2600 based on the first DFE signal Vdfe_p and the second DFE signal Vdfe_n. Thus, the receiver 2000 may remove the multi-tap post cursor including the first tap post cursor, the second tap post cursor, and the third tap post cursor generated according to the levels of the data signals received before the first data signal.

Figure 13:
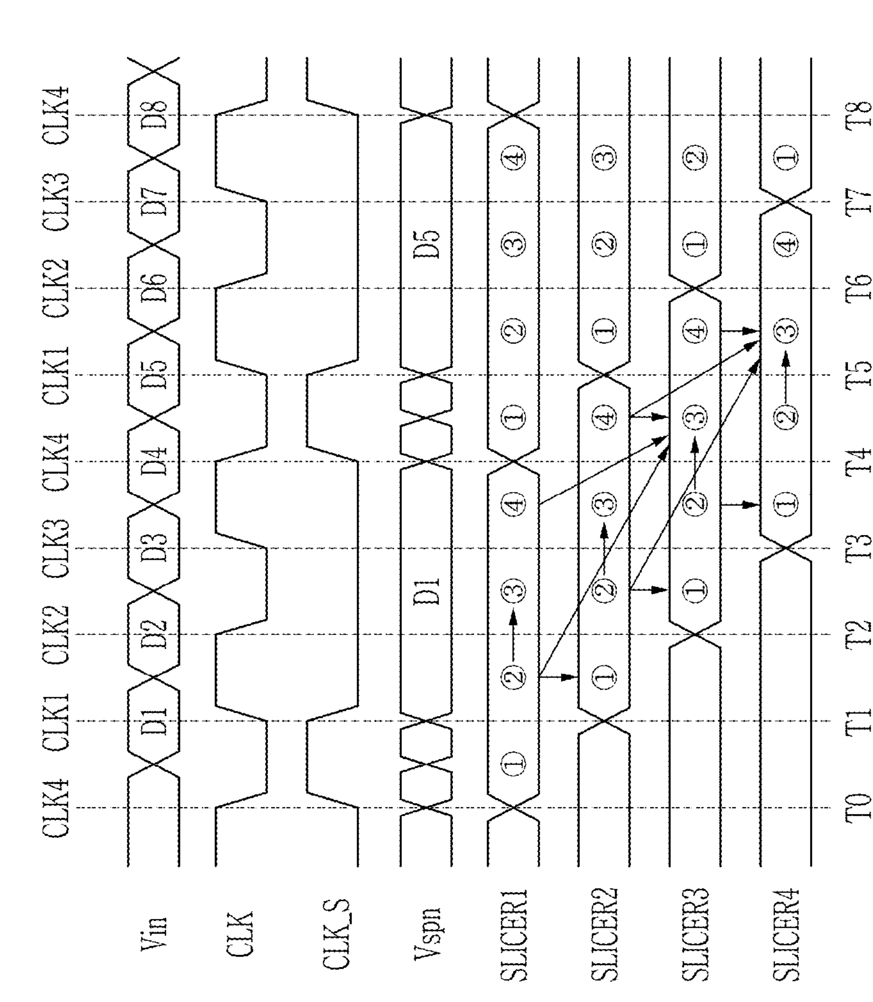
FIG. 13 is a timing diagram illustrating operations of slicers according to one or more embodiments.

FIG. 13 is a timing diagram illustrating operations of slicers according to one or more embodiments.

Referring to FIG. 13, the receiver 2000 may sequentially receive first to eighth data signals D1-D8. The receiver 2000 may determine MSB data and LSB data corresponding to each level of the first to eighth data signals D1-D8. For example, a case of applying a second tap DFE that corrects a level of one data signal based on the MSB data and he LSB data of two data signals received before one data signal will be described in FIG. 13.

In one or more embodiments, the receiver 2000 may include a plurality of slicers. In one or more embodiments, the receiver may include first to fourth slicers SLICER1-SLICER4. The first to fourth slicers SLICER1-SLICER4 may operate in a time-interleaving manner. The first to fourth slicers SLICER1-SLICER4 may perform an operation of determining the MSB data and the LSB data of the first to eighth data signals D1-D8 in an overlapping manner. In one or more embodiments, the first slicer SLICER1 may determine the MSB data and the LSB data corresponding to the level of the first data signal D1, the second slicer SLICER2 may determine the MSB data and the LSB data corresponding to the level of the second data signal D2, the third slicer SLICER3 may determine the MSB data and the LSB data corresponding to the level of the third data signal D3, and the fourth slicer SLICER4 may determine the MSB data and the LSB data corresponding to the level of the fourth data signal D4.

In one or more embodiments, in a section from T0 to T1, the sample/hold circuit 2500 may receive the first data signal D1 received as the input signal Vin according to a switch clock signal CLK_S. In one or more embodiments, the first switch S1 and the second switch S2 of FIG. 7 may be closed in response to the switch clock signal CLK_S with a high level, and a charge may be charged in the first capacitor Cp and the second capacitor Cn.

In one or more embodiments, in a section from T1 to T2, the switch clock signal CLK_S may transition to a low level, and the first switch S1 and the second switch S2 may be opened. The sample/hold circuit 2500 may sample and hold the first data signal D1, and may provide the first sample signal and the second sample signal Vspn corresponding to the first data signal D1 to the first slicer SLICER1 in response to a rising edge of the clock signal CLK.

In one or more embodiments, in the section from T1 to T2, the first slicer SLICER1 may determine the MSB data of the first data signal D1 based on a result of comparing the level of the first data signal D1 with the first reference voltage. The MSB data of the first data signal D1 may be output to the first DFE circuit 2400.

In a section from T2 to T3, the first slicer SLICER1 may change the first reference voltage to the second reference voltage higher than the first reference voltage or the third reference voltage lower than the first reference voltage based on the MSB data of the first data signal.

In a section from T3 to T4, the first slicer SLICER1 may determine the LSB data of the first data signal D1 based on a result of comparing the level of the first data signal D1 with the second reference voltage or the third reference voltage.

In one or more embodiments, in the section from T1 to T2, the first DFE circuit 2400 may receive the second data signal D2 as the input signal Vin, may correct the level of the second data signal D2 based on the MSB data of the first data signal D1 received from the first slicer SLICER1, and may output the second data signal D2 to the second slicer SLICER2.

In the section from T2 to T3, the second slicer SLICER2 may determine the MSB data of the second data signal D2 based on a result of comparing the level of the second data signal D2 with the first reference voltage. The MSB data of the second data signal D2 may be output to the first DFE circuit 2400.

In the section from T3 to T4, the second slicer SLICER2 may correct the level of the second data signal D2 based on the LSB data of the first data signal D1 determined by the first slicer SLICER1, and may change the first reference voltage to the second reference voltage or the third reference voltage based on the MSB data of the second data signal D2.

In a section from T4 to T5, the second slicer SLICER2 may determine the LSB data of the second data signal D2 based on a result of comparing the level of the second data signal D2 with the second reference voltage or the third reference voltage.

In one or more embodiments, in the section from T2 to T3, the first DFE circuit 2400 may receive the third data signal D3 as the input signal Vin, may correct the level of the third data signal D3 based on the MSB data of the second data signal D2 received from the second slicer SLICER2, and may output the third data signal D3 to the third slicer SLICER3.

In the section from T3 to T4, the third slicer SLICER3 may determine the MSB data of the third data signal D3 based on a result of comparing the level of the third data signal D3 with the first reference voltage. The MSB data of the third data signal D3 may be output to the first DFE circuit 2400.

In the section from T4 to T5, the third slicer SLICER3 may correct the level of the third data signal D3 based on the LSB data of the second data signal D2 determined by the second slicer SLICER2 and the MSB data and the LSB data of the first data signal D1 determined by the first slicer SLICER1. In the section from T4 to T5, the third slicer SLICER3 may change the first reference voltage to the second reference voltage or the third reference voltage based on the MSB data of the third data signal D3.

In a section from T5 to T6, the third slicer SLICER3 may determine the LSB data of the third data signal D3 based on a result of comparing the level of the third data signal D3 with the second reference voltage or the third reference voltage.

In the section from T3 to T4, the first DFE circuit 2400 may receive the fourth data signal D4 as the input signal Vin, may correct the level of the fourth data signal D4 based on the MSB data of the third data signal D3 received from the third slicer SLICER3, and may output the fourth data signal D4 to the fourth slicer SLICER4.

In the section from T4 to T5, the fourth slicer SLICER4 may determine the MSB data of the fourth data signal D4 based on a result of comparing the level of the fourth data signal D4 with the first reference voltage. The MSB data of the fourth data signal D4 may be output to the first DFE circuit 2400.

In the section from T5 to T6, the fourth slicer SLICER4 may correct the level of the fourth data signal D4 based on the LSB data of the third data signal D3 determined by the third slicer SLICER3 and the MSB data and the LSB data of the second data signal D2 determined by the second slicer SLICER2.

In one or more embodiments, when a third tap DFE correcting a level of one data signal based on MSB data and LSB data of three data signals received before the one data signal is applied, in a section T5 to T6, the fourth slicer SLICER4 may correct the level of the fourth data signal D4 based on the LSB data of the third data signal D3 determined by the third slicer SLICER3, the MSB data and the LSB data of the second data signal D2 determined by the second slicer SLICER2, and the MSB data and the LSB data of the first data signal D1 determined by the first slicer SLICER1.

In the section from T5 to T6, the fourth slicer SLICER4 may change the first reference voltage to the second reference voltage or the third reference voltage based on the MSB data of the fourth data signal D4.

In a section from T6 to T7, the fourth slicer SLICER4 may determine the LSB data of the fourth data signal D4 based on a result of comparing the level of the fourth data signal D4 with the second reference voltage or the third reference voltage.

In a section from T4 to T6, the first slicer SLICER1 may receive the fifth data signal D5 with a level corrected according to the MSB data of the fourth data signal D4 from the first DFE circuit 2400, and may determine the MSB data of the fifth data signal D5.

In a section from T6 to T8, the first slicer SLICER1 may correct the level of the fifth data signal D5 based on the LSB data of the fourth data signal D4 determined by the fourth slicer SLICER4 and the MSB data and the LSB data of the third data signal D3 determined by the third slicer SLICER3, and may determine the LSB data of the fifth data signal D5 based on the level of the fifth data signal D5.

In one or more embodiments, when the third tap DFE is applied, in the section from T6 to T8, the first slicer SLICER1 may correct the level of the fifth data signal D5 based on the LSB data of the fourth data signal D4 determined by the fourth slicer SLICER4, the MSB data and the LSB data of the third data signal D3 determined by the third slicer SLICER3, and the MSB data and the LSB data of the second data signal D2 determined by the second slicer SLICER2, and may determine the LSB data of the fifth data signal D5 based on the level of the fifth data signal D5.

Figure 14:
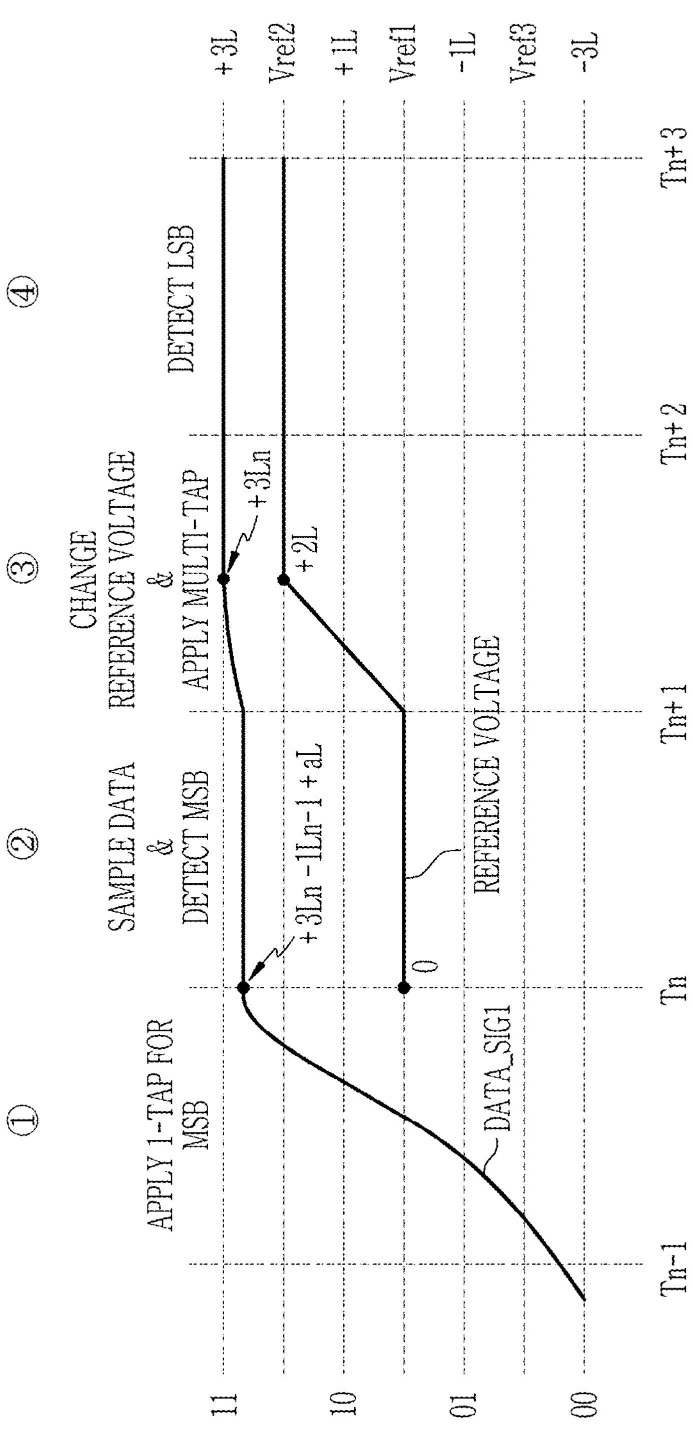
FIG. 14 is a diagram illustrating a receiver that detects first bit data and second bit data based on the level of the corrected data signal according to one or more embodiments.

FIG. 14 is a diagram illustrating a receiver that detects first bit data and second bit data based on the level of the corrected data signal according to one or more embodiments.

In FIG. 14, a case where the receiver 2000 receives the first data signal DATA_SIG1 corresponding to +3 level (+3L) and the second data signal received before the first data signal DATA_SIG1 corresponds to the −3 level (−3L) will be described as an example.

Referring to FIG. 14, in a section from Tn−1 to Tn, the receiver 2000 may receive the first data signal DATA_SIG1. The receiver 2000 may correct a level of the first data signal DATA_SIG1 based on MSB data of the second data signal received before the first data signal DATA_SIG1. The level of the first data signal DATA_SIG1 may be changed from the +3n level (+3Ln) to the +3n−3n−1+a level (+3Ln−3Ln−1+aL) under an influence of the second data signal and data signals received before the second data signal. −3n−1 level (−3Ln−1) may be a level that indicates a degree to which the level of the first data signal DATA_SIG1 changes under an influence of the second data signal. The a level (aL) may be a level indicating a degree to which the level of the first data signal DATA_SIG1 changes under an influence of the data signals received before the second data signal.

In the section from Tn−1 to Tn, the receiver 2000 may correct the level of the first data signal DATA_SIG1 from the +3n−3n−1+a level (+3Ln−3Ln−1+aL) to +3n−1n−1+a level (+3Ln−1Ln−1+aL) based on the MSB data of the second data signal. In the section from Tn−1 to Tn, the receiver 2000 may reduce the level of the first data signal DATA_SIG1 by 2n−1 level (2Ln−1) based on the MSB data of the second data signal.

In a section from Tn to Tn+1, the receiver 2000 may sample the first data signal DATA_SIG1, and may determine MSB data of the first data signal DATA_SIG1 based on a result of comparing the level of the first data signal DATA_SIG1 with a reference voltage REFERENCE VOLTAGE. In one or more embodiments, because +3n−1n−1+a level (+3Ln−1Ln−1+aL) that is the level of the first data signal DATA_SIG1 is higher than a first reference voltage Vref1, the receiver 2000 may determine a bit value of the MSB data of the first data signal as "1".

In a section from Tn+1 to Tn+2, the receiver 2000 may correct the level of the first data signal DATA_SIG1 based on LSB data of the second data signal received before the first data signal DATA_SIG1 and MSB data and LSB data of data signals received before the second data signal.

In the section from Tn+1 to Tn+2, the receiver 2000 may correct the level of the first data signal DATA_SIG1 from +3n−1n−1+a level (+3Ln−1Ln−1+aL) to +3n level (+3Ln). The receiver 2000 may increase the level of the first data signal DATA_SIG1 by 1n−1 level (1Ln−1) based on the LSB data of the second data signal. The receiver 2000 may reduce the level of the first data signal DATA_SIG1 by the a level (aL) based on the MSB data and the LSB data of the data signals received before the second data signal.

In the section from Tn+1 to Tn+2, the receiver 2000 may change the reference voltage (REFERENCE VOLTAGE) to the second reference voltage Vref2 higher than the first reference voltage Vref1 or the third reference voltage Vref3 lower than the first reference voltage based on the MSB data of the first data signal DATA_SIG1. In one or more embodiments, in the section from Tn+1 to Tn+2, the receiver 2000 may change the first reference voltage Vref1 to the second reference voltage Vref2 because a bit value of the MSB data of the first data signal DATA_SIG1 corresponds to "1". The second reference voltage Vref2 may correspond to +2 level (+2L).

In a section from Tn+2 to Tn+3, the receiver 2000 may determine LSB data of the first data signal DATA_SIG1 based on a result of comparing the level of the first data signal DATA_SIG1 with the second reference voltage Vref2. Because +3n level (+3Ln) that is the level of the first data signal DATA_SIG1 is higher than the second reference voltage Vref2, the receiver 2000 may determine a bit value of the LSB data of the first data signal DATA_SIG1 as "1".

Figure 15:
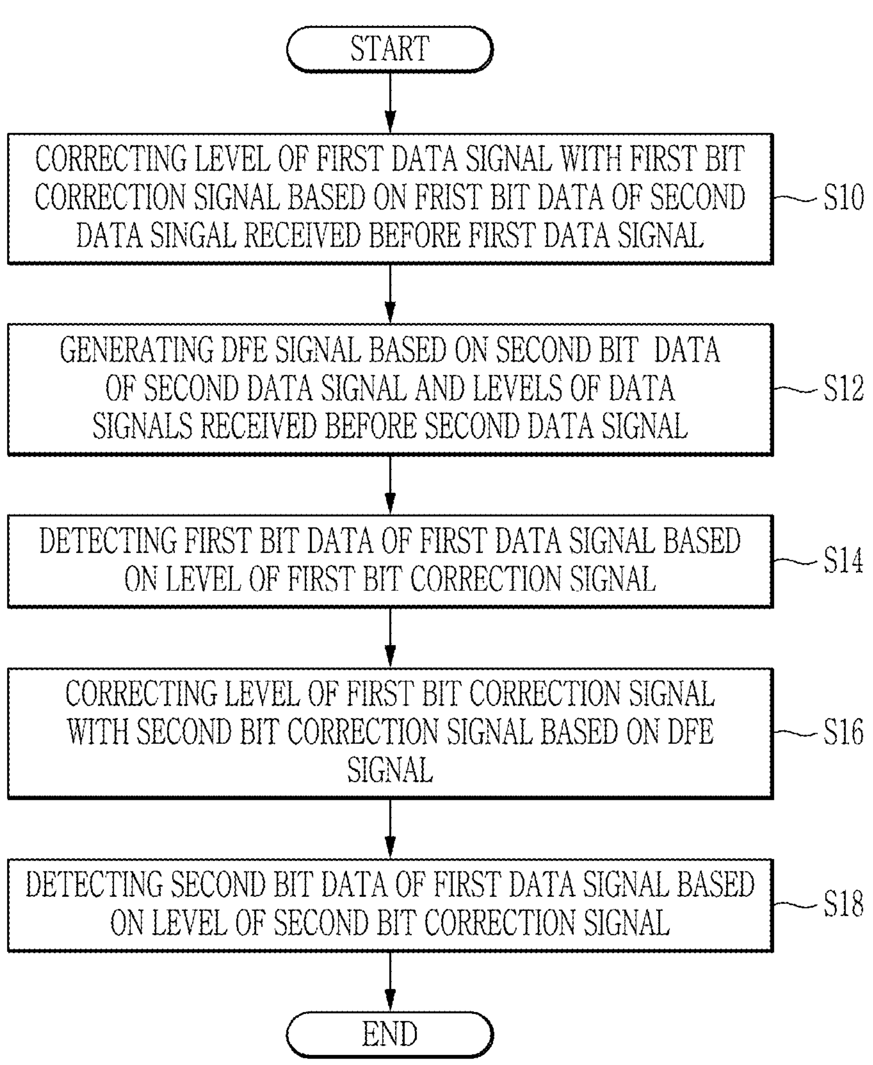
FIG. 15 is a flowchart illustrating an operation of the receiver according to one or more embodiments.

FIG. 15 is a flowchart illustrating an operation of the receiver according to one or more embodiments.

Referring to FIG. 15, in operation S10, the receiver 2000 may receive the first data signal, and may correct a level of the first data signal with the first bit correction signal based on first bit data of the second data signal received before the first data signal. The first bit data may be MSB data. The first bit correction signal may be a signal that increases or decreases the level of the first data signal. The level of the first data signal may correspond to a level difference between the first differential signal and the second differential signal. The first bit correction signal may correspond to a level difference between the first differential correction signal and the second differential correction signal.

In one or more embodiments, the receiver 2000 may generate the first bit correction signal with a level higher than that of the first data signal if a bit value of the first bit data of the second data signal corresponds to "0". In one or more embodiments, the receiver 2000 may generate the first bit correction signal with a level lower than that of the first data signal if the bit value of the first bit data of the second data signal corresponds to "0".

In operation S12, the receiver 2000 may generate a DFE signal based on second bit data of the second data signal and levels of data signals received before the second data signal. The DFE signal may be a signal used to correct a level of the first bit correction signal.

In operation S14, the receiver 2000 may determine first bit data of the first data signal based on the level of the first bit correction signal. In one or more embodiments, the receiver 2000 may determine the first bit data of the first data signal based on a result of comparing the level of the first bit correction signal with the first reference voltage.

In operation S16, the receiver 2000 may correct the level of the first bit correction signal with the second bit correction signal based on the DFE signal. The second bit correction signal may be a signal that increases or decreases the level of the first bit correction signal. The second bit correction signal may respond to a level difference between the first output signal and the second output signal generated by the slicer.

In operation S18, the receiver 2000 may determine second bit data of the first data signal based on a level of the second bit correction signal. The second bit data may be LSB data. In one or more embodiments, the receiver 2000 may determine the second bit data of the first data signal based on a result of comparing the level of the second bit correction signal with the second reference voltage or the third reference voltage.

Figure 16:
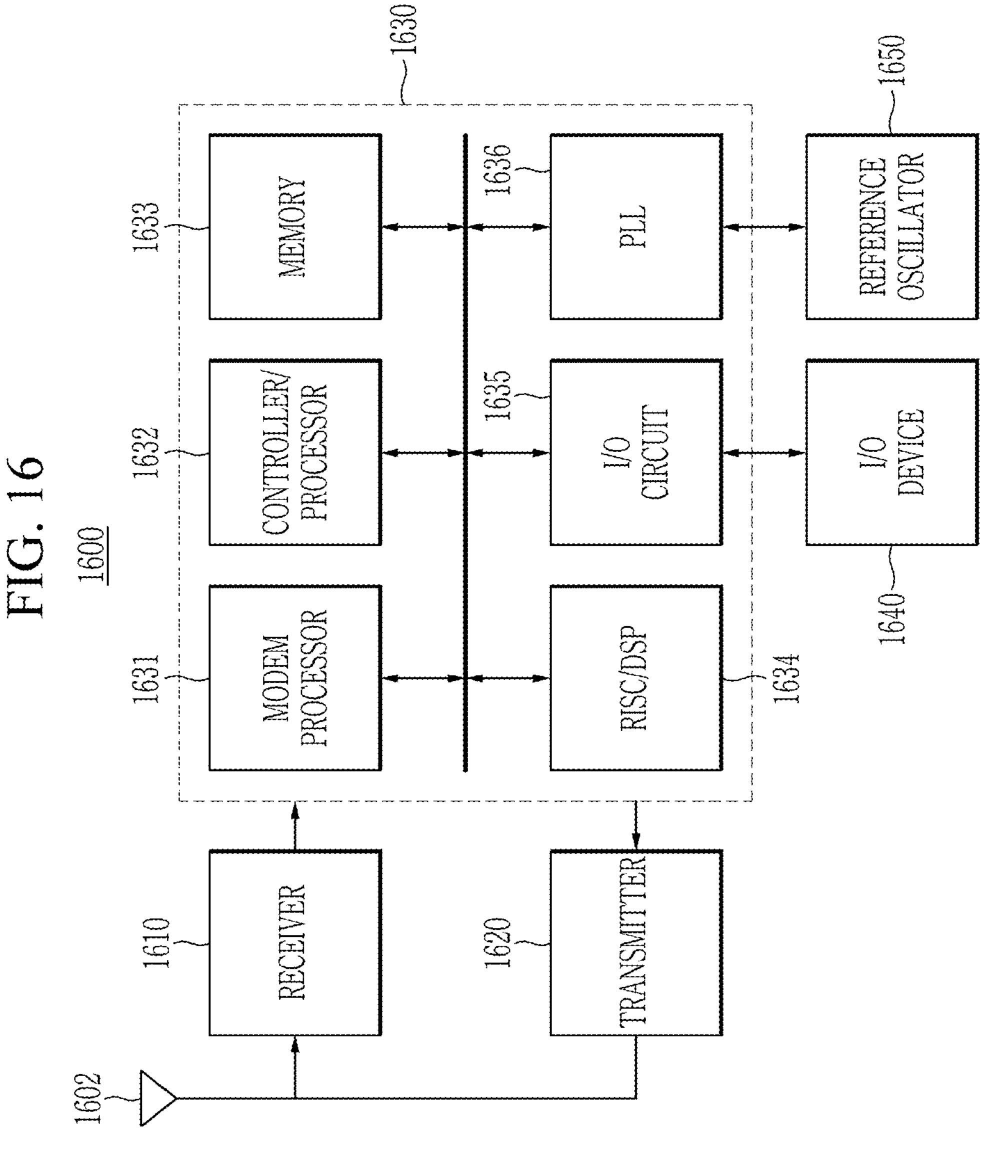
FIG. 16 is a diagram illustrating a communication device according to one or more embodiments.

FIG. 16 is a diagram illustrating a communication device according to one or more embodiments.

Referring to FIG. 16, the communication device 1600 may include an antenna 1602, a receiver 1610, a transmitter 1620, a communication module 1630, an input/output device 1640, and a reference oscillator 1650. As described above with reference to FIGS. 1 to 15, the receiver 1610 may be a receiver that determines MSB data and LSB data of the data signal based on a level of the data signal. The receiver 1610 may convert the data signal received from the outside through the antenna 1602 into a symbol corresponding to the level of the data signal, and then may provide the converted symbol to the communication module 1630. The transmitter 1620 may convert a data signal received from the communication module 1630 into an analog signal, and then may output the converted data signal to the outside through the antenna 1602.

The communication module 1630 may include a modem processor 1631, a controller/processor 1632, a memory 1633, a reduced instruction set computer (RISC)/digital signal processor (DSP) 1634, an input/output device 1635, and a phase-locked loop 1636.

The modem processor 1631 may perform a processing operation such as encoding, modulation, demodulation, decoding, or the like for data transmission and data reception. The controller/processor 1632 may control blocks within the communication module 1630. The memory 1633 may store data and various instruction codes. The RISC/DSP 1634 may perform a general or specialized processing operation in the communication device 1600. The input/output device 1635 may communicate with an external input/output device 1640. The input/output device 1635 may include the receiver 2000 described above with reference to FIGS. 1 to 15. The input/output device 1635 may convert the level of the data signal received from the external input/output device 1640 into a symbol corresponding to the level. The phase-locked loop 1636 may perform a frequency modulation operation using a frequency signal received from the reference oscillator 1650. The reference oscillator 1650 may be implemented as a crystal oscillator (XO), a voltage-controlled crystal oscillator (VCXO), a temperature compensated crystal oscillator (TCXO), or the like. The communication module 1630 may perform a processing operation required for communication using an output signal generated at the phase-locked loop 1636.

Figure 17:
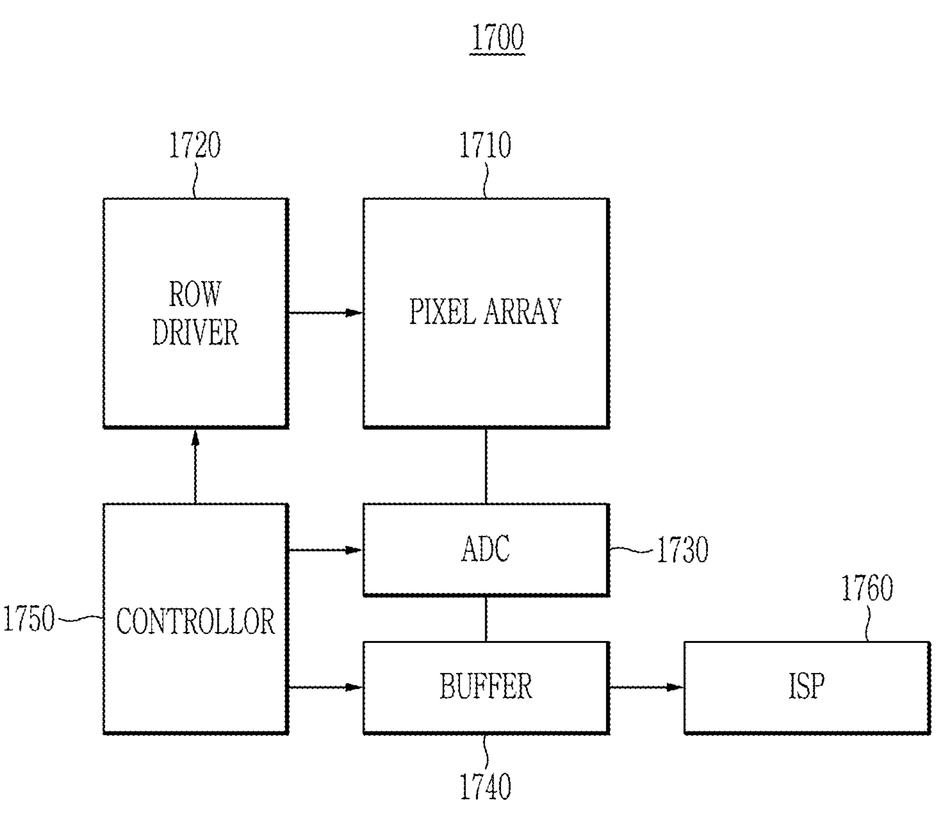
FIG. 17 is a diagram illustrating an image device according to one or more embodiments.

FIG. 17 is a diagram illustrating an image device according to one or more embodiments.

Referring to FIG. 17, the image device 1700 may include a pixel array 1710, a row driver 1720, an analog-to-digital converter (ADC) 1730, a buffer 1740, a controller 1750, and an image processor 1760.

The pixel array 1710 may include a plurality of pixels. Specifically, the pixels disposed at a row of the pixel array 1710 may be simultaneously turned on by a row selection line, and pixel signals of each column may be selectively provided to an output line by a column selection line. A plurality of row/column selection lines may be provided for an entire pixel array 1710.

The row driver 1720 may selectively and/or sequentially activate row lines.

The ADC 1730 may convert a data signal output from the pixels of the pixel array 1710 into a digital signal. The ADC 1730 may include the receiver described above with reference to FIGS. 1 to 15. The ADC 1730 may convert the data signal received from the pixel array 1710 into a symbol corresponding to a level of the data signal.

The buffer 1740 may buffer the digital signal converted by the ADC 1730, and may output the buffered digital signal to the image processor 1760.

The image processor 1760 may process the digital signal to provide output image color reproduction of an image captured by the plurality of pixels of the pixel array 1710. Specifically, the image processor 1760 may perform various operations, and for example, the various operations may include positional gain adjustment, defect correction, noise reduction, optical crosstalk reduction, demosaicing, resizing, sharpening, and the like.

Figure 18:
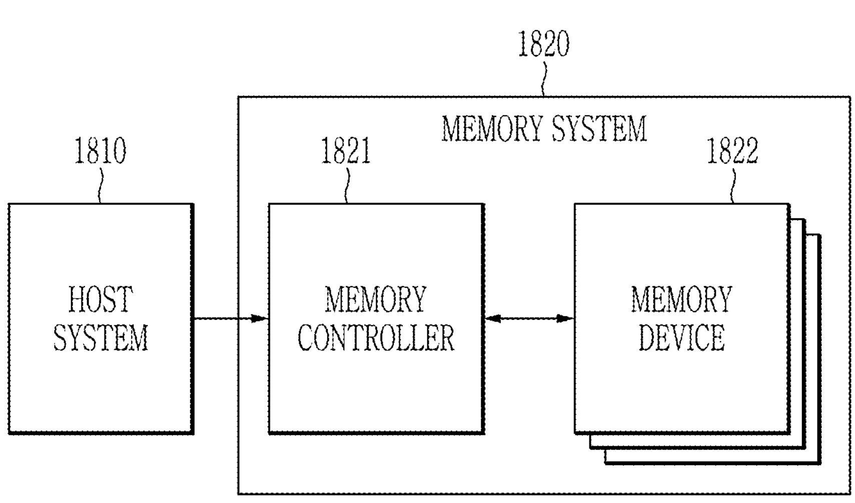
FIG. 18 is a diagram illustrating a memory system according to one or more embodiments.

FIG. 18 is a diagram illustrating a memory system according to one or more embodiments.

Referring to FIG. 18, an electronic system 1800 may include a host system 1810 and a memory system 1820. The host system 1810 and the memory system 1820 may communicate through an interface 1830, and the memory system 1820 may include a memory controller 1821 and memory devices 1822.

The interface 1830 may use an electrical signal and/or an optical signal, and a non-limiting example may be implemented as a serial advanced technology attachment (SATA) interface, a SATA express (SATAe) interface, a serial attached small (SAS) computer system interface (serial attached SCSI), a universal serial bus (USB) interface, or a combination thereof. The host system 1810 and the memory controller 1821 may include SerDes for serial communication.

The memory device 1822 may be a volatile memory or a nonvolatile memory, and the memory system 1820 may be referred to as a storage system. In one or more embodiments, the memory system 1820 may be implemented as a solid state drive (SSD), an embedded SSD (eSSD), a multimedia card (MMC), an embedded multimedia card (eMMC), or the like. The memory controller 1821 may control the memory devices 1822 in response to a request received from the host system 1810 through the interface 1830.

In one or more embodiments, the receiver 2000 described above with reference to FIGS. 1 to 15 may be implemented to be included in the memory controller 1821, the memory devices 1822, and the host system 1810, respectively. Specifically, the memory controller 1821, the memory devices 1822, and the host system 1810 may receive a multi-level data signal, and may convert the data signal into a symbol corresponding to a level of the data signal.

Figure 19:
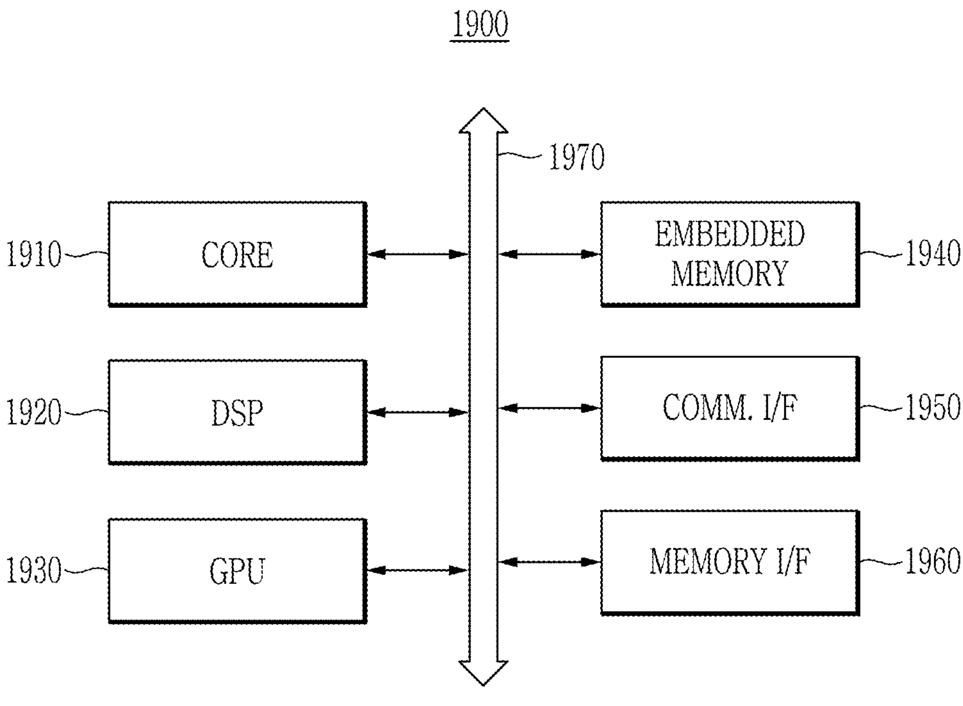
FIG. 19 is a diagram illustrating a system-on-chip according to one or more embodiments.

FIG. 19 is a diagram illustrating a system-on-chip according to one or more embodiments.

A system-on-chip (SoC) 1900 may be referred to as an integrated circuit in which components of a computing system or another electronic system are integrated. For example, an application processor (AP) included in the system-on-chip 1900 may include components for a processor and other functions.

Referring to FIG. 19, the system-on-chip 1900 may include a core 1910, a DSP 1920, a GPU 1930, a built-in memory 1940, a communication interface 1950, and a memory interface 1960. Components of the system-on-chip 1900 may communicate with each other through a bus 1970.

The core 1910 may process commands, and may control operations of components included in the system-on-chip 1900. For example, the core 1910 may drive an operating system and may execute applications on the operating system by processing a series of commands. The DSP 1920 may generate useful data by processing a digital signal (e.g., a digital signal provided from the communication interface 1950). The GPU 1930 may generate data for an image output through a display device from image data provided from the built-in memory 1940 or the memory interface 1960, and may encode the image data. The built-in memory 1940 may store data necessary for the core 1910, the DSP 1920, and the GPU 1930 to operate. The memory interface 1960 may provide an interface for an external memory (e.g., a dynamic random access memory (DRAM), a flash memory, or the like) of the system-on-chip 1900.

The communication interface 1950 may provide serial communication with the outside of the system-on-chip 1900. For example, the communication interface 1950 may be connected to Ethernet, and may include SerDes for serial communication.

In one or more embodiments, the receiver 2000 described above with reference to FIGS. 1 to 15 may be included in the communication interface 1950 and the memory interface 1960. Specifically, the communication interface 1950 or the memory interface 1960 may receive a multi-level data signal, and may convert the data signal into a symbol corresponding to a level of the data signal. At least one of the components, elements, modules, units, or the like (collectively "components" in this paragraph) represented by a block or an equivalent indication (collectively "block") in the above embodiments including the drawings, for example, slicer, flip-flop, etc., may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A receiver comprising:

a first decision feedback equalization (DFE) circuit configured to receive a first multi-level data signal, and output a first bit correction signal correcting a level of the first multi-level data signal based on first bit data of a second multi-level data signal received before the first multi-level data signal;

a second DFE circuit configured to output a DFE signal based on second bit data of the second multi-level data signal and levels of data signals received before the second multi-level data signal; and a slicer configured to determine first bit data of the first multi-level data signal based on a level of the first bit correction signal, correct the level of the first bit correction signal with a second bit correction signal based on the DFE signal, and determine second bit data of the first multi-level data signal based on a level of the second bit correction signal.

2. The receiver of claim 1, further comprising:

a differential amplification circuit configured to generate a first differential signal and a second differential signal based on the first multi-level data signal and a reference signal.

3. The receiver of claim 2, wherein the first DFE circuit is configured to output a first differential correction signal configured to correct a level of the first differential signal and a second differential correction signal configured to correct a level of the second differential signal based on the first bit data of the second multi-level data signal, and wherein the level of the first bit correction signal corresponds to a level difference between the first differential correction signal and the second differential correction signal.

4. The receiver of claim 3, wherein the first DFE circuit comprises:

a first transistor configured to turn on based on the first bit data of the second multi-level data signal, and correct the level of the first differential signal; and a second transistor configured to turn on based on data in which the first bit data of the second multi-level data signal is inverted, and correct the level of the second differential signal.

5. The receiver of claim 4, wherein, based on the first bit data of the second multi-level data signal having a first level, the first transistor is configured to turn off, the second transistor is configured to turn on, and the level of the first bit correction signal is increased, and wherein, based on the first bit data of the second multi-level data signal having a second level less than the first level, the first transistor is configured to turn on, the second transistor is configured to turn off, and the level of the first bit correction signal is decreased.

6. The receiver of claim 3, further comprising:

a sample/hold circuit configured to output a first sample signal and a second sample signal sampling the first differential correction signal and the second differential correction signal.

7. The receiver of claim 6, wherein the slicer comprises:

a sense amplifier configured to generate a first output signal and a second output signal based on a difference between the first sample signal and the second sample signal, and output the first bit data of the first multi-level data signal based on a comparison of a first reference voltage with a difference between the first output signal and the second output signal.

8. The receiver of claim 7, wherein the slicer further comprises:

a reference voltage correction circuit configured to output the first bit data of the first multi-level data signal, and change the first reference voltage to a second reference voltage that is greater than the first reference voltage or a third reference voltage that is less than the first reference voltage based on the first bit data of the first multi-level data signal.

9. The receiver of claim 7, wherein the slicer further comprises:

a multi-tap correction circuit configured to correct a level of the first output signal and a level of the second output signal based on the DFE signal, and wherein the level of the second bit correction signal corresponds to a difference between the corrected first output signal and the corrected second output signal.

10. The receiver of claim 9, wherein the sense amplifier is further configured to output the second bit data of the first multi-level data signal based on a comparison of the difference between the corrected first output signal and the corrected second output signal, with a second reference voltage that is greater than the first reference voltage or a third reference voltage that is less than the first reference voltage.

11. The receiver of claim 1, wherein the second DFE circuit is further configured to generate a first tap current based on the second bit data of the second multi-level data signal, generate a second tap current based on first bit data and second bit data of a third multi-level data signal received before the second multi-level data signal, generate a third tap current based on first bit data and second bit data of a fourth multi-level data signal received before the third multi-level data signal, and generate the DFE signal based on the first tap current, the second tap current, and the third tap current.

12. A receiver comprising:

a slicer configured to receive a first multi-level data signal, and determine first bit data and second bit data of the first multi-level data signal based on a level of the first multi-level data signal; and a first decision feedback equalization (DFE) circuit configured to receive a second multi-level data signal following the first multi-level data signal, and correct a level of the second multi-level data signal based on the first bit data of the first multi-level data signal, wherein the slicer is further configured to determine first bit data of the second multi-level data signal based on the level of the second multi-level data signal, correct the level of the second multi-level data signal based on the second bit data of the first multi-level data signal, and determine second bit data of the second multi-level data signal based on the level of the second multi-level data signal.

13. The receiver of claim 12, wherein the first DFE circuit is further configured to decrease the level of the second multi-level data signal based on the first bit data of the first multi-level data signal having a first level, and increase the level of the second multi-level data signal based on the first bit data of the first multi-level data signal having a second level that is less than the first level.

14. The receiver of claim 12, wherein the slicer comprises:

a sense amplifier configured to output the first bit data of the second multi-level data signal based on a comparison of the level of the second multi-level data signal with a first reference voltage.

15. The receiver of claim 14, wherein the slicer further comprises:

a reference voltage correction circuit configured to determine the first bit data of the second multi-level data signal, and change the first reference voltage to a second reference voltage that is greater than the first reference voltage based on the level of the second multi-level data signal being greater than the first reference voltage.

16. The receiver of claim 15, further comprising:

a second DFE circuit configured to generate a multi-tap current based on the first bit data of the first multi-level data signal and levels of data signals received before the first multi-level data signal, and output a DFE signal configured to correct the level of the second multi-level data signal based on the multi-tap current.

17. The receiver of claim 16, wherein the sense amplifier is further configured to output the second bit data of the second multi-level data signal based on a comparison of the second reference voltage with a level of the second multi-level data signal that is corrected by the DFE signal.

18. An electronic system comprising:

a transmitter configured to sequentially transmit a first multi-level data signal and a second multi-level data signal; and a receiver configured to receive the first multi-level data signal, determine first bit data and second bit data of the first multi-level data signal based on a level of the first multi-level data signal, receive the second multi-level data signal, correct a level of the second multi-level data signal based on the first bit data of the first multi-level data signal, determine first bit data of the second multi-level data signal based on the level of the second multi-level data signal, correct the level of the second multi-level data signal based on the second bit data of the first multi-level data signal, and determine second bit data of the second multi-level data signal based on the level of the second multi-level data signal.

19. The electronic system of claim 18, wherein the receiver comprises:

a first decision feedback equalization (DFE) circuit configured to increase or decrease the level of the second multi-level data signal based on the first bit data of the first multi-level data signal.

20. The electronic system of claim 18, wherein the receiver comprises:

a second decision feedback equalization (DFE) circuit configured to generate a first tap current based on the second bit data of the first multi-level data signal, and generate a decision feedback equalization signal correcting the level of the second multi-level data signal based on the first tap current.

* * * * *